(12) United States Patent
Eddaoudi et al.

(10) Patent No.: US 9,138,719 B1
(45) Date of Patent: Sep. 22, 2015

(54) METAL-ORGANIC MATERIALS (MOMS) FOR $CO_2$ ADSORPTION AND METHODS OF USING MOMS

(71) Applicants: Mohamed Eddaoudi, Tampa, FL (US); Michael J. Zaworotko, Tampa, FL (US); Patrick Nugent, Tampa, FL (US); Stephen Burd, Tampa, FL (US); Ryan Luebke, Thuwal (SA); Youssef Belmabkhout, Thuwal (SA)

(72) Inventors: Mohamed Eddaoudi, Tampa, FL (US); Michael J. Zaworotko, Tampa, FL (US); Patrick Nugent, Tampa, FL (US); Stephen Burd, Tampa, FL (US); Ryan Luebke, Thuwal (SA); Youssef Belmabkhout, Thuwal (SA)

(73) Assignee: University of South Florida, Tampa, FL (US)

( * ) Notice: Subject to any disclaimer, the term of this patent is extended or adjusted under 35 U.S.C. 154(b) by 150 days.

(21) Appl. No.: 13/800,690

(22) Filed: Mar. 13, 2013

Related U.S. Application Data

(60) Provisional application No. 61/723,533, filed on Nov. 7, 2012, provisional application No. 61/682,017, filed on Aug. 10, 2012.

(51) Int. Cl.
*B01D 53/02* (2006.01)
*B01J 20/22* (2006.01)

(52) U.S. Cl.
CPC .................................. *B01J 20/226* (2013.01)

(58) Field of Classification Search
CPC ....................................................... B01J 20/226
See application file for complete search history.

(56) References Cited

U.S. PATENT DOCUMENTS

| | | | |
|---|---|---|---|
| 2003/0004364 A1* | 1/2003 | Yaghi et al. ...................... | 556/46 |
| 2006/0054022 A1 | 3/2006 | Hosoe et al. | |
| 2008/0184881 A1* | 8/2008 | Zhou et al. ......................... | 95/43 |
| 2009/0277837 A1* | 11/2009 | Liu et al. ........................ | 210/650 |
| 2010/0239512 A1 | 9/2010 | Morris et al. | |
| 2010/0282080 A1* | 11/2010 | Omary et al. ................... | 95/141 |
| 2011/0138999 A1 | 6/2011 | Willis | |
| 2011/0237796 A1 | 9/2011 | Inubushi et al. | |
| 2012/0012495 A1 | 1/2012 | Morrison et al. | |
| 2012/0118153 A1* | 5/2012 | Omary et al. ................... | 95/143 |

OTHER PUBLICATIONS

International Search Report and the Written Opinion of the International Searching Authority; Feb. 28, 2014, Application Serial No. PCT/US2013/068879; Korean Intellectual Property Office; 9 pages.

* cited by examiner

*Primary Examiner* — Christopher P Jones
(74) *Attorney, Agent, or Firm* — Thomas Horstemeyer, LLP

(57) ABSTRACT

Embodiments of the present disclosure provide for hydrophobic multi-component metal-organic materials (MOMs) (also referred to as "hydrophobic MOM"), systems that exhibit permanent porosity and using hydrophobic MOMs to separate components in a gas, methods of separating $CO_2$ from a gas, and the like.

8 Claims, 22 Drawing Sheets

METAL-ORGANIC MATERIALS (MOMS) FOR $CO_2$ ADSORPTION AND METHODS OF USING MOMS

CROSS-REFERENCE TO RELATED APPLICATION

This application claims priority to U.S. provisional application entitled "Metal Organic Composition, for Carbon Dioxide Separation and Capture," having Ser. No. 61/682,017, filed on Aug. 10, 2012, which is entirely incorporated herein by reference. This application also claims priority to U.S. provisional application entitled "Metal Organic Composition, for Carbon Dioxide Separation and Capture," having Ser. No. 61/723,533, filed on Nov. 7, 2012, which is entirely incorporated herein by reference.

BACKGROUND

Metal-organic framework (MOF) materials that exhibit permanent porosity have received extensive interest due to their potential applications for gas storage or capture. However, many of the currently used MOFs have limitations, in particular, use in humid conditions, and thus, other types of MOFs having desired characteristics are needed to be used in certain applications.

SUMMARY

Embodiments of the present disclosure provide for hydrophobic multi-component metal-organic materials (MOMs) (also referred to as "hydrophobic MOM") systems that exhibit permanent porosity and using hydrophobic MOMs to separate components in a gas, methods of separating $CO_2$ from a gas, and the like.

An embodiment of the method of capturing $CO_2$ in a gas, among others, includes: exposing the gas to a hydrophobic multicomponent metal-organic material (MOM) (e.g., have a primitive cubic topology), wherein the gas includes $CO_2$ and water vapor, wherein the MOM has a greater relative affinity for $CO_2$ over the water vapor; and capturing the $CO_2$ in the MOM through adsorption.

An embodiment of the system for capturing $CO_2$ in a gas mixture, among others, includes: a first structure including a hydrophobic multicomponent metal-organic material (MOM) having a primitive cubic topology, wherein the gas includes $CO_2$ and water vapor, wherein the MOM has a greater relative affinity for $CO_2$ over the water vapor; and a second structure for introducing the gas to the first structure, wherein $CO_2$ is removed from the gas after the exposure to the hydrophobic MOM to form a modified gas, wherein the second structure flows the modified gas away from the first structure.

An embodiment of the method of separating components in a gas mixture, among others, includes: exposing a gas including a first component and a second component to a hydrophobic multicomponent metal-organic material (MOM) having a primitive cubic topology, wherein the MOM has a greater relative affinity for the first component over a second component; and capturing the first component in the MOM.

An embodiment of the system for separating components in a gas mixture, among others, includes: a first structure including a hydrophobic multicomponent metal-organic material (MOM) having a primitive cubic topology, wherein the gas includes a first component and a second component, wherein the MOM has a greater relative affinity for the first component over the second component; and a second structure for introducing the gas to the first structure, wherein first component is removed from the gas after the exposure to the hydrophobic MOM to form a modified gas, wherein the second structure flows the modified gas away from the first structure.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

FIG. 11($b$) illustrates a graph showing $CO_2/N_2$ (10/90 mixture) and $CO_2/CH_4$ (50/50 mixture) IAST selectivity of SIFSIX-2-Cu and SIFSIX-2-Cu-i, calculated from the low pressure isotherms at 298 K. FIG. 11($c$) illustrates a graph showing $CO_2$Qst of SIFSIX-2-Cu and SIFSIX-2-Cu-i, estimated from low pressure isotherms at 273 and 298 K by applying the virial equation.

FIG. 12($b$) illustrates a graph showing a column breakthrough experiment of a $CO_2/CH_4$:50/50 binary gas system at 298 K and 1 bar on SIFSIX-2-Cu-i. FIG. 12($c$) illustrates a graph showing a column breakthrough experiment of a $CO_2/H_2$:30/70 binary gas system at 298 K and 1 bar on SIFSIX-2-Cu-i.

FIG. 21($b$) is a graph that illustrates an example of one cycle column breakthrough experiment for $CO_2/H_2$:30/70 binary gas systems at 298 K and 1 bar under dry conditions and in the presence of 74% RH carried out on SIFSIX-2-Cu-i.

FIG. 22($b$) illustrates an example of one cycle column breakthrough experiment for $CO_2/H_2$:30/70 binary gas system at 298 K and 1 bar under dry conditions and in the presence of 74% RH carried out on SIFSIX-3-Zn.

DISCUSSION

Figure 1:
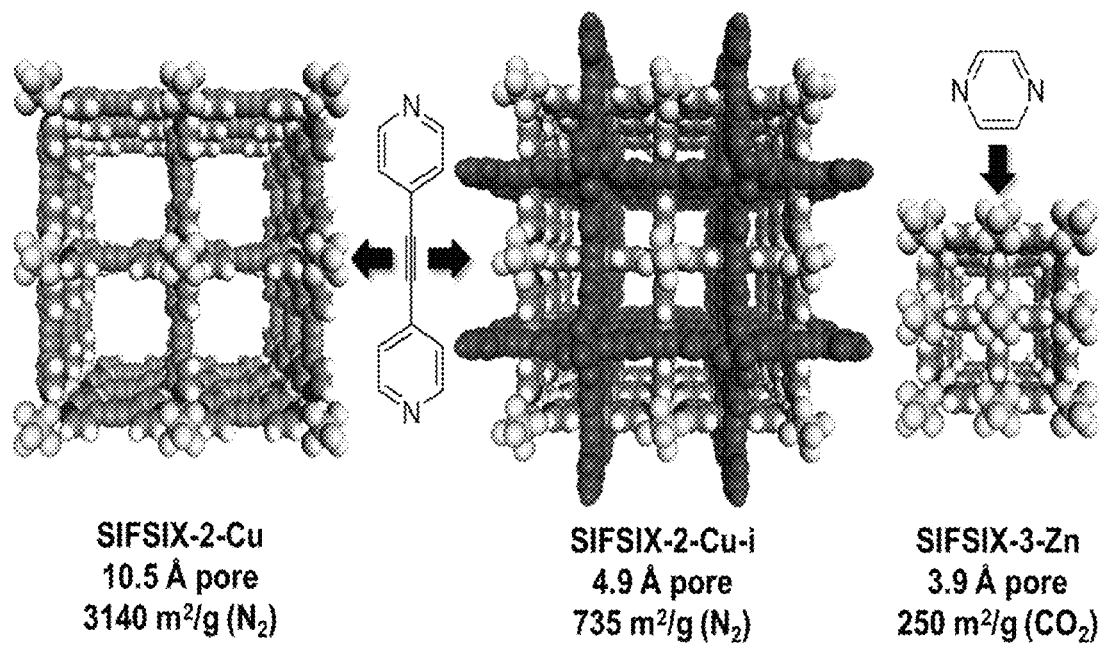
FIG. 1: The variable pore size channel structures of SIFSIX-2-Cu, SIFSIX-2-Cu-i and SIFSIX-3-Zn. a, SIFSIX-2-Cu; pore size 13.05 Å, BET apparent surface area ($N_2$ adsorption) 3,140 $m^2$ $g^{-1}$. b, SIFSIX-2-Cu-i; pore size 5.15 Å, BET apparent surface area ($N_2$ adsorption) 735 $m^2$ $g^{-1}$. c, SIFSIX-3-Zn; pore size 3.84 Å, apparent surface area (determined from $CO_2$ adsorption isotherm) 250 $m^2$ $g^{-1}$. Color code: C (grey), N (blue (dark gray)), Si (yellow (medium gray)), F (light blue (light gray)), H (white). All guest molecules are omitted for clarity. Note that the green (dark grey) net represents the interpenetrated net in SIFSIX-2-Cu-i. The nitrogen-containing linker present in SIFSIX-2-Cu and SIFSIX-2-Cu-i is 4,4'-dipyridylacetylene (dpa) whereas that in SIFSIX-3-Zn is pyrazine (pyr). The lower portion is a schematic of a basic structure of the MOM.
Figure 1:
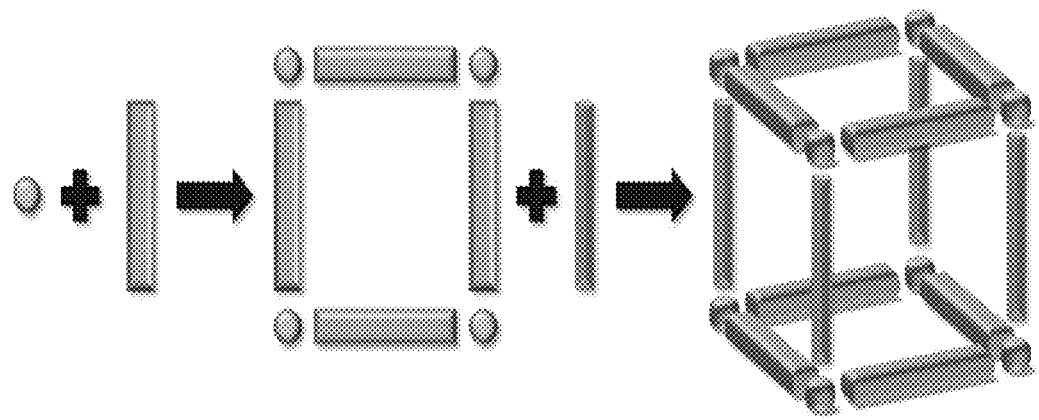

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, organometallic chemistry, coordination chemistry and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

General Discussion:

Embodiments of the present disclosure provide for hydrophobic multi-component metal-organic materials (MOMs) (also referred to as "hydrophobic MOM"), systems that exhibit permanent porosity and using hydrophobic MOMs to separate components in a gas, methods of separating $CO_2$ from a gas, and the like.

Water vapor is a problem with most porous materials because it interacts strongly through chemical bonding to unsaturated metal centers or moderately through hydrogen bonding if there are hydrogen bonding sites. Porous materials that have amines grafted to their pores (for chemical bonding with $CO_2$) also tend to react with water vapor. Embodiments of the present disclosure describe MOMs that have no unsaturated metal centers and the pore walls have no hydrogen bonding donors or acceptors, while having strong electrostatics for inducing dipoles in polarizable molecules such as $CO_2$. In short, embodiments of the present disclosure have enhanced $CO_2$ interactions at the same time we have reduced interactions with water vapor.

In an embodiment, the hydrophobic MOM can be porous and can be a three dimensional net so that molecules can be disposed (e.g., captured) within (e.g., pores or cavities) the hydrophobic MOM to the exclusion of other molecules. In an embodiment, the hydrophobic MOM combines sorption thermodynamics and kinetics to achieve advantageous results. For example, a gas such as $CO_2$ is absorbed faster and stronger than other gases in the gas mixture, so that $CO_2$ can be captured in the hydrophobic MOMs to the substantial exclusion of the other gases.

In an embodiment, the hydrophobic MOM can be used to separate $CO_2$ from one or more other gases, where the gas includes water vapor. Due to its hydrophobic characteristic, hydrophobic MOMs can be used in methods and systems that use gases that include water vapor, which was not previously possible in porous materials that exhibit strong physisoprtion towards $CO_2$. This is advantageous because other systems and methods that use other MOMs or other porous materials must separate water vapor from the gas prior to the gas being introduced to the other MOMs or porous materials since the other MOMs or porous materials have a higher affinity for the water vapor than $CO_2$. If the water vapor is not removed, the other MOMs are not effective at removing $CO_2$. Embodiments of the systems and methods can be simplified and result in reduced expenditure since the water vapor does not have to be removed prior to introduction to the hydrophobic MOMs. Even in the presence of water vapor, hydrophobic MOMs used in embodiments of the present disclosure are more effective at removing $CO_2$ and are highly selective in separating $CO_2$ from other gases such as $N_2$, $H_2$, and/or $CH_4$.

In particular, embodiments of the present disclosure can be used in $CO_2$ capture, gas separation, and the like, in post-combustion systems (e.g., flue gas to separate $CO_2$ and $N_2$), pre-combustion systems (e.g., shifted synthesis gas stream to separate $CO_2$ and $H_2$), and/or natural gas upgrading (e.g., natural gas cleanup to separate $CO_2$ and $CH_4$). In an embodiment, the hydrophobic MOMs can be used to separate other gases and can be used in processes such as He separation from natural gas, Ar separation, Kr separation, $H_2/D_2$ separation, iodine separation, and separation of unsaturated hydrocarbons from saturated hydrocarbons.

Embodiments of the present disclosure provide for hydrophobic multi-component MOMs that are three dimensional nets that have a primitive cubic topology (See FIG. 1) that can be used in methods and systems of the present disclosure. In an embodiment, the MOM can include a metal organic framework. In an embodiment, the hydrophobic MOM (e.g., [Cu(4,4'-dipyridylacetylene)$_2$(SiF$_6^{2-}$)]$_n$) can be designed and synthesized using two dimensional square grids (or nets) (e.g., Cu(4,4'-dipyridylacetylene)$_2$) that are linked via metal nodes using a pillar (e.g., SiF$_6^{2-}$). In an embodiment, the two dimensional square grids include metal cations, metal cluster molecular building blocks (MBBs), or metal-organic polyhedral supermolecular building blocks (SBBs). The MBBs or SBBs serve the geometric role of the node in a network and they are connected by organic molecules, inorganic anions and/or metal complexes, which serve as linkers. The two dimensional square grids are connected to one another using other linkers or pillars that connect the metal nodes. In an embodiment, the components of the hydrophobic MOM (the two dimensional square grids, and its components, and pillars) can be selected to design a hydrophobic MOM that can be used in a system or method that includes water vapor and is highly effective at separating gases due to the hydrophobic MOM having a higher relative affinity for one component of the gas (e.g., $CO_2$) over one or more other components (e.g., $N_2$, $H_2$, and $CH_4$) in the gas. In this way not only is the hydrophobic MOM able to operate in methods and systems having high water vapor conditions, but the hydrophobic MOM is highly selective between or among $CO_2$ and other components.

In an embodiment, a method of the present disclosure includes exposing a gas to a hydrophobic multi-component MOM as described herein. As noted above, the hydrophobic MOM has a greater relative affinity for a first component of the gas over a second component of the gas. The phrase "greater relative affinity" or similar phrases mean that a hydrophobic MOM will interact with a first component much more strongly than a second component so that the MOM and the first component interact to the substantial exclusion of the second component. In an embodiment, the affinity can be controlled by linkers in the hydrophobic MOM that exhibit strong enough electrostatic potential to induce polarization in one component of the gas. Thus, the first component can be captured (e.g., separated) from the gas mixture to form a modified gas, where the modified gas includes the second component and a substantially reduced amount (e.g., greater than about 80% or more, about 90% or more, about 95% or more, about 99% or more, about 99.9% or more, removal of the first component from the gas) of the first component.

As described herein, a substantial advantage of embodiments of the present disclosure is that methods and systems using the hydrophobic MOMs can be conducted using a gas having water vapor, which is a completely unexpected result since other MOMs and related inorganic porous materials are typically hydrophilic and have a strong affinity for water so that the water vapor needs to be substantially or completely removed from the gas for the MOM to be commercially viable. In an embodiment, the water vapor in the gas can be at a concentration of about 1% to 10% at a temperature of about 273K to 340K.

In an embodiment, the gas can include two or more components and includes water vapor. In an embodiment, gas does not include water vapor. In an embodiment, the component can include one or more of the following: $CO_2$, $N_2$, $H_2$, $CH_4$, He, hydrocarbons having 2 or more carbons (saturated or unsaturated and/or linear or branched), and a combination thereof. In an embodiment, $CO_2$ can be in the gas in an amount of about 400 ppm to 50%. In an embodiment, $N_2$ can be in the gas in an amount of about 50% to 99.99%. In an embodiment, $H_2$ can be in the gas in an amount of about 50% to 99.99%. In an embodiment, $CH_4$ can be in the gas in an amount of about 50% to 99.99%. In an embodiment, He can be in the gas in an amount of about 50% to 99.99%.

It should be noted that in many situations, the gas may primarily include a few components or only a few components that are important to the desired separation. For example, in post-combustion systems such as one that contains flue gas, the two main components (e.g., in the presence of water vapor) for separation are $CO_2$ and $N_2$. In another example, in pre-combustion systems such as shifted synthesis gas streams, the two main components to separate are $CO_2$ and $H_2$. In another embodiment, in natural gas upgrading systems such as natural gas cleanup, the two main components to separate are $CO_2$ and $CH_4$. In another embodiment, in a He separation system, the two main components to separate are He and natural gas.

In an embodiment, the components in a gas can be separated using a system to introduce the gas to the hydrophobic MOM and remove the modified gas. In an embodiment, a first structure or device including the hydrophobic MOM can be interfaced with a second structure or device to introduce a gas to the first structure so that the gas and the hydrophobic MOM can interact so that the hydrophobic MOM can capture the first component (e.g., $CO_2$). After a sufficient period of time and under appropriate temperature conditions, the remaining gas or modified gas can be removed from the first structure. This process can be repeated as appropriate for the particular system. After a period of time, the first component can be removed from the hydrophobic MOM and the hydrophobic MOM can be reused and/or recycled using an appropriate gas handling system.

In an embodiment, the first structure and the second structure can include those used in systems such as post-combustion systems, pre-combustion systems, natural gas upgrading systems, and He separation systems. In particular, the first structure can include structures such as those used in typical systems mentioned above. In an embodiment, the second structure can include standard gas handling systems, valves, pumps, flow meters, and the like.

As mentioned above, the separation method or system using the hydrophobic MOMs can be used to selectively remove $CO_2$ from $N_2$, $H_2$, and/or $CH_4$. In an embodiment, the selectivity for $CO_2/N_2$ can be about 100 or more, about 500 or more, about 1000 or more, or about 2000 or more, based on ideal absorbed solution theory (IAST) calculations (described in greater detail in the Example) and at conditions similar to those described in the Example. In an embodiment, the selectivity for $CO_2/N_2$ can be about 100 or more, about 500 or more, about 1000 or more, or about 2000 or more, based on breakthrough experiments (described in greater detail in the Example) and at conditions of similar to those described in the Example.

In an embodiment, the selectivity for $CO_2/H_2$ can be about 100 or more, about 500 or more, about 1000 or more, or about 2000 or more, based on IAST calculations and at conditions similar to those described in the Example. In an embodiment, the selectivity for $CO_2/H_2$ can be about 100 or more, about 500 or more, about 1000 or more, or about 2000 or more, based on breakthrough experiments (described in greater detail in the Example) and at conditions of similar to those in the Example.

In an embodiment, the selectivity for $CO_2/CH_4$ can be about 100 or more, about 500 or more, about 1000 or more, or about 2000 or more, based on based on IAST calculations and at conditions of similar to those described in the Example. In an embodiment, the selectivity for $CO_2/CH_4$ can be about 100 or more, about 500 or more, about 1000 or more, or about 2000 or more, based on breakthrough experiments (described in greater detail in the Example) and at conditions of similar to those described in the Example.

As noted above, hydrophobic MOMs can be three dimensional nets that can have a primitive cubic topology but they could also exhibit a different topology (See FIG. 1). In an embodiment, the hydrophobic MOM can be designed and synthesized using two dimensional square nets that are linked via metal nodes using a molecule or ion that serves the role of a pillar. In an embodiment, the two dimensional square nets can include metal cations, MBBs, or SBBs, and linkers can be used to bond the metal ions and the MBB and the SBB.

In an embodiment, hydrophobic MOMs can have one of the following generic structures: $(M(L)_a(P)_n)$, where M is the metal ion, L is the linker, and P is the pillar, a is 2 and n is 1. L and P can be difunctional ligands that are capable of linking the metal clusters or ions such as pyrzazine, 4,4'-bipyridine, 1,4-benzenedicarboxylate, hexafluorosilicate, and hexafluorotitanate. In an embodiment, these types of hydrophobic MOMs are described in references 13-15 below in the Example, which are incorporated herein by reference for how to describe MOMs and MOFs and the components of each.

In an embodiment, the metal cations can include $M^{1+}$ (e.g., Na, K, Li, Ag, etc.); $M^{2+}$ (e.g., Cu, Zn, Co, Mn, Mo, Cr, Fe, Ca, Ba, Cs, Pb, Pt, Pd, Ru, Rh, Cd, etc.); $M^{3+}$ (e.g. In, Fe, Y, Ln (Yb, Tb, etc.)); $M^{4+}$ (e.g., Zr, Ti, V, etc.); or other higher oxidative state metals such as +4, +5, +6, +7, and +8. In an embodiment, the MBBs and SBBs can include these metal cations as well.

In an embodiment, the linkers in the two dimensional square grid can include organic molecules, inorganic anions and/or metal complexes. In an embodiment, the linkers can include pyrazine (substituted and unsubstituted) and derivatives thereof, bipyridine (substituted and unsubstituted) and derivatives thereof, and the like.

In an embodiment, the pillars can include organic molecules, inorganic anions and/or metal complexes. In an embodiment, the pillars can include $SiF_6^{2-}$, $GeF_6^{2-}$, $TiF_6^{2-}$, $SnF_6^{2-}$, $PF_6^{-}$, and $NO_3^{-}$.

In an embodiment, the hydrophobic MOM can include: $[Cu(4,4'-dipyridylacetylene)_2(SiF_6)]_n$, where n is 1 to 100,000,000; a pair of interpenetrated nets of $[Cu(4,4'-dipyridylacetylene)_2(SiF_6)]_n$; and $\{[Zn(pyr)_2(SiF_6)]_n\}$, wherein n is 1 to 100,000,000.

EXAMPLE

Now having described the embodiments of the present disclosure, in general, the Examples describe some additional embodiments of the present disclosure. While embodiments of present disclosure are described in connection with the Examples and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

Brief Introduction

The energy costs associated with the separation and purification of industrial commodities such as gases, fine chemicals and fresh water currently consumes around 15% of global energy production and the demand for such commodities is projected to triple by 2050[1]. The challenge of developing effective separation and purification technologies that exhibit a much smaller energy footprint is pronounced with $CO_2$, which, in addition to its notoriety with climate change, is an impurity in natural gas, biogas, syngas and many other gas streams. In such a context, porous crystalline materials that can exploit both equilibrium and kinetic selectivity, size selectivity and targeted molecular recognition, are attractive targets for $CO_2$ separation and capture as exemplified by zeolites 5A and 13X[2], as well as Metal-Organic Materials (MOMs)[3-9]. Here we report that a crystal engineering[7] or reticular chemistry[5,9] strategy that controls pore functionality and size in a series of MOMs with coordinately saturated metal centers and periodically arrayed $SiF_6^{2-}$ (SIFSIX) anions enables a "sweet spot" of kinetics and thermodynamics that offers high volumetric uptake at low $CO_2$ partial pressure (<0.15 bar) and most importantly an unprecedented $CO_2$ sorption selectivity over $N_2$, $H_2$ and $CH_4$ even in the presence of moisture. These MOMs are therefore relevant to $CO_2$ separation in the context of post-combustion (flue gas $CO_2/N_2$), pre-combustion (shifted synthesis gas stream $CO_2/H_2$) and natural gas upgrading (natural gas cleanup $CO_2/CH_4$).

Example Discussion:

Porous materials with unsaturated metal centers (UMCs)[10] or organic amines that chemically interact with $CO_2$ enhance selectivity for $CO_2$ in the presence of other gases. However there are drawbacks: high energy costs associated with activation, regeneration and recycling of the sorbent material, especially for amines[11]; competition with water vapor, especially for UMCs[12]; selectivity tends to monotonically decrease with increased loading of sorbate. Consequently, there remains a need for sorbents with favorable $CO_2$ sorption kinetics and thermodynamics over a wide range of $CO_2$ loading that would permit efficient $CO_2$ capture with low regeneration costs. MOMs are attractive in this context because they are inherently modular, i.e. metals or metal clusters ("nodes" or "molecular building blocks") coordinated to multi-functional organic ligands ("linkers"), and they offer extra large surface areas up to 7000 m²/g.[6] However, although extra-large surface area facilitates high gravimetric uptake of gases at low temperature and/or high pressure, it is not necessarily conducive to efficient separations under practical conditions. We herein address how to optimize the thermodynamics and kinetics of gas adsorption through a class of MOMs that is amenable to crystal engineering or isoreticular chemistry in a manner that facilitates exquisite control over pore size and functionality: "pillared grids", 2D nets based upon linked metal nodes that are pillared in the $3^{rd}$ dimension to form 3D nets with primitive cubic (pcu) topology[3]. [Cu(4,4'-bipyridine)$_2$(SiF$_6$)], a prototypal pcu net that remains one of the best sorbents for $CH_4$ as measured by volumetric uptake[14], exhibits highly selective $CO_2$ uptake vs. both $CH_4$ and $N_2$ at 1 bar and 298 K[15]. In the absence of UMCs or amine groups, we attributed this behavior to favorable $CO_2$— SIFSIX interactions. This compound, SIFSIX-1-Cu, exhibits 1D square channels (pore size 8.5 Å) aligned by a periodic array of SIFSIX pillars and is prototypal for a class of compounds that is amenable to pore-size tuning. In this contribution we report the synthesis, structure and remarkable sorption properties of three variants of SIFSIX-1-Cu with expanded and contracted pore sizes.

Figure 7:
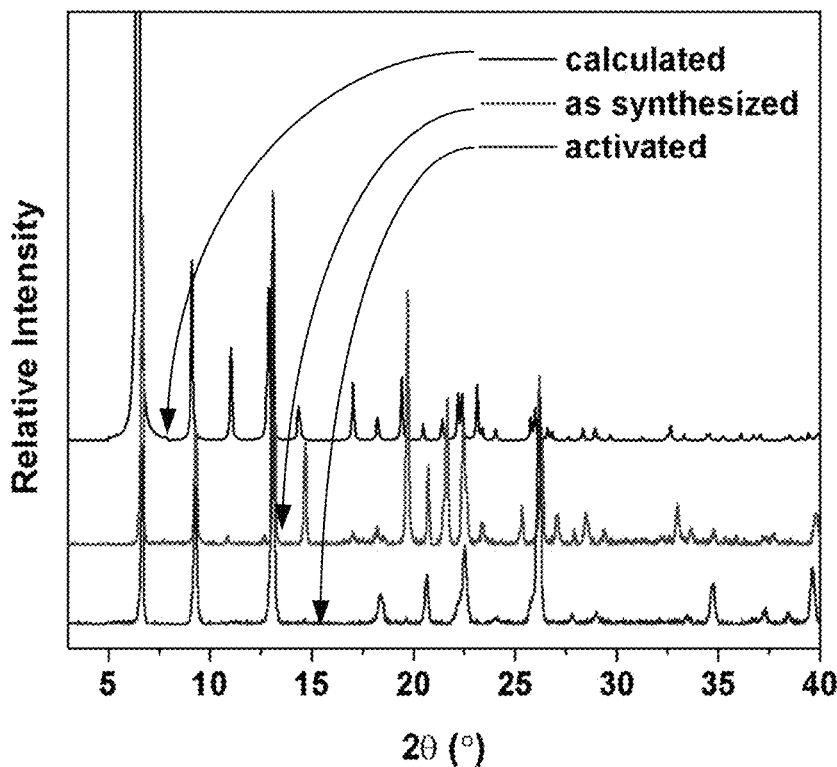
FIG. 7 illustrates a graph showing room temperature PXRD patterns of SIFSIX-2-Cu.
Figure 8:
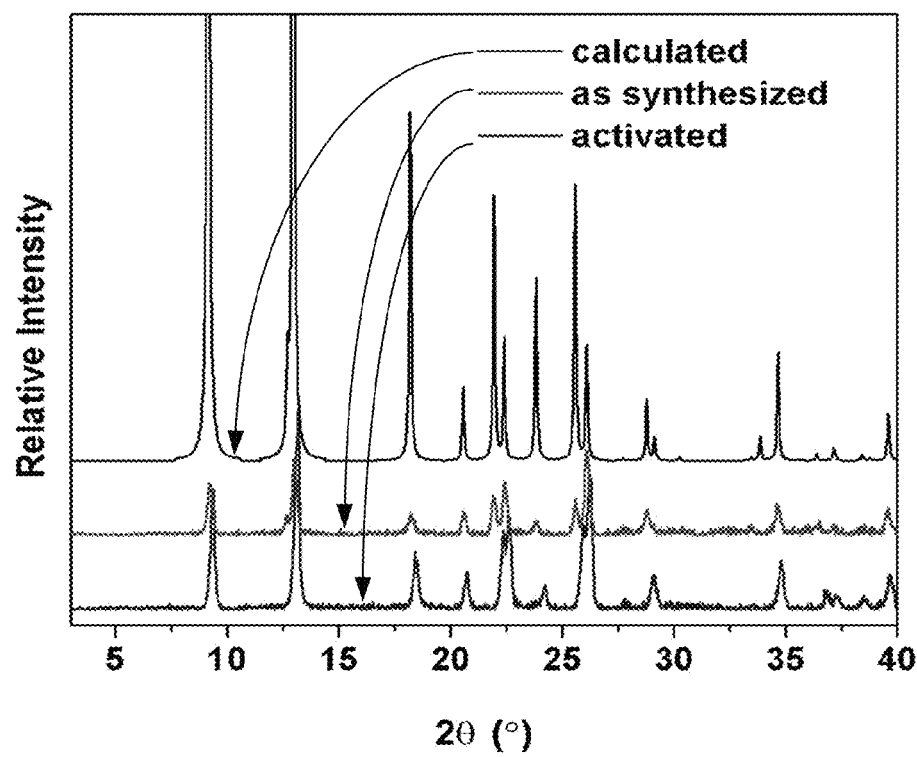
FIG. 8 illustrates a graph showing room temperature PXRD patterns of SIFSIX-2-Cu-i.
Figure 9:
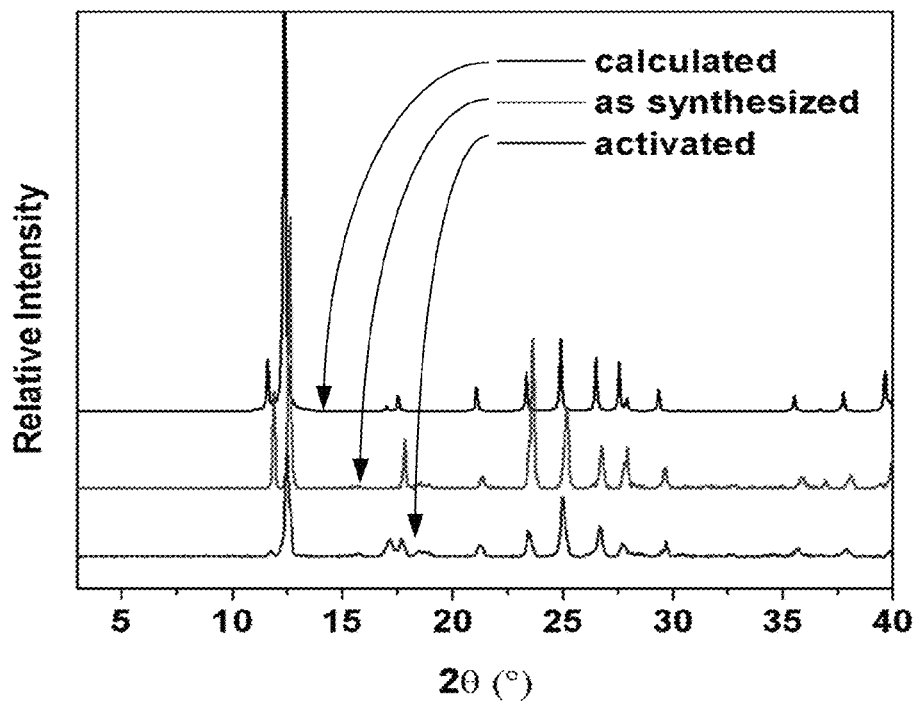
FIG. 9 illustrates a graph showing room temperature PXRD patterns of SIFSIX-3-Zn.

Reaction of 4,4'-dipyridylacetylene, dpa[16] with CuSiF$_6$ afforded purple rod-shaped crystals of SIFSIX-2-Cu $\{[Cu(dpa)_2(SiF_6)]_n\}$ (see Supporting Information for synthetic and crystallographic details for this and other compounds reported herein). SIFSIX-2-Cu forms the expected pcu net with square channels of pore dimensions 10.5×10.5 Å² (FIG. 1a). The interpenetrated polymorph, SIFSIX-2-Cu-i, is composed of doubly interpenetrated nets that are isostructural to the nets in SIFSIX-2-Cu. The independent nets are staggered with respect to one another affording 4.9 Å pores if measured diagonally (FIG. 1b). SIFSIX-3-Zn, $\{[Zn(pyr)_2(SiF_6)]_n\}$, was prepared according to published procedures[17] and is also a pcu net which encloses 3.9×3.9 Å² channels (FIG. 1c). Pore sizes in this series therefore range from ultra-microporous to nanoporous. Bulk purity was confirmed using powder x-ray diffraction patterns (PXRD) (FIGS. 7-9).

Figure 10:
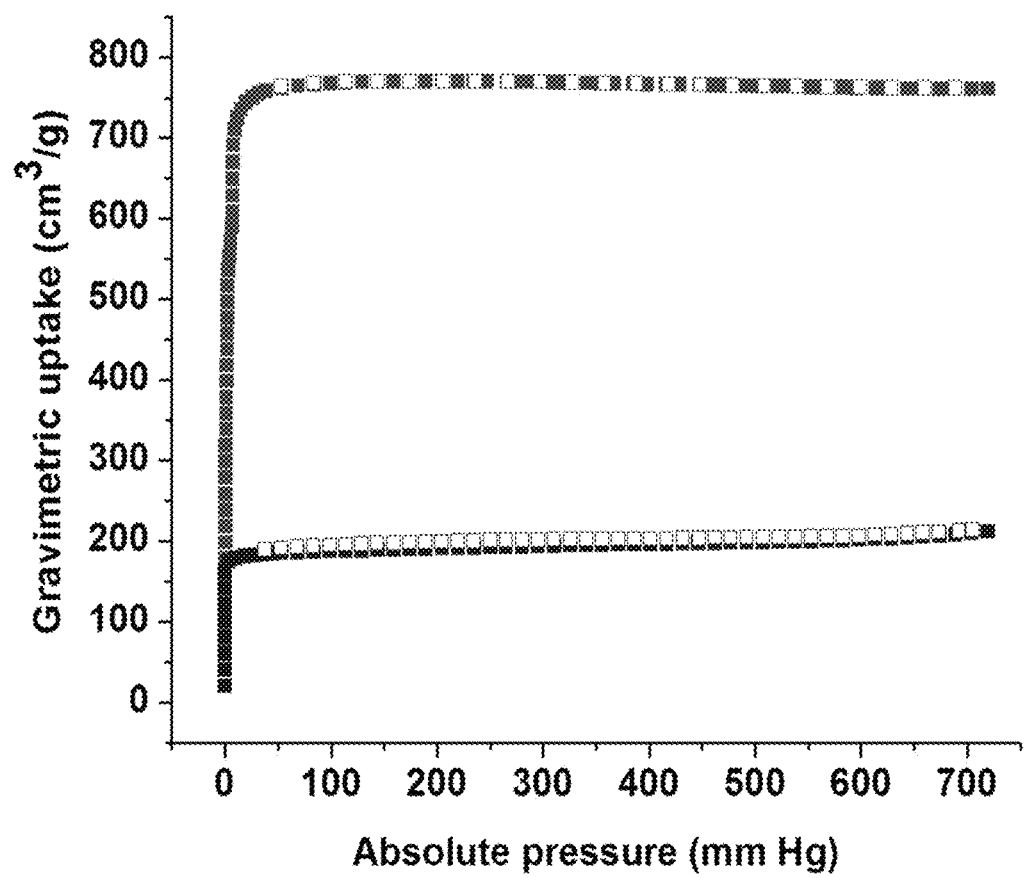
FIG. 10 illustrates a graph showing the $N_2$ adsorption isotherms of SIFSIX-2-Cu (red) and SIFSIX-2-Cu-i (blue) at 77 K. Adsorption and desorption are represented by closed and open symbols, respectively.

Pure Gas Adsorption Studies. Sub-atmospheric pressure gas adsorption studies of $H_2$, $CO_2$, $CH_4$, and $N_2$ are detailed in Table 1. Activation of SIFSIX-2-Cu and SIFSIX-2-Cu-i (evacuation at 295K for 12 hours) afforded BET apparent surface areas of 3140 and 735 m²/g, respectively, (corresponding Langmuir values 3370 and 821 m²/g) from $N_2$ adsorption isotherms at 77 K. Micropore volumes are in good agreement with corresponding theoretical values (FIG. 10 and Table 3, Supplemental section). SIFSIX-3-Zn adsorbs minimal amounts of $N_2$ at 77 K and thus its surface area (250 m²/g) was determined from the $CO_2$ isotherm collected at 298 K[18].

TABLE 1

Summary of single gas and gas mixture adsorption results compared to those for Mg-dobdc and zeolite 13X.

| Compounds→ | | SIFSIX-2-Cu | SIFSIX-2-Cu-i | SIFSIX-3-Zn | Mg-dobdc[f] | 13X[g] |
|---|---|---|---|---|---|---|
| Pore size (Å) | | 13.05 | 5.15 | 3.84 | 10.8 | 10 |
| $CO_2 Q_{st}$ at low $CO_2$ loading (kJ/mol) | | 22 | 31.9 | 45 | 47-52 | 44-54 |
| Single $CO_2$ uptake (298 K) (mg/g) at 0.1 bar/1 bar | | 10/81.3 | 76/238 | 105/112 | 220/352 | 106/220 |
| Single $CO_2$ uptake (298 K) ($cm^3/cm^3$) at 0.1 bar/1 bar | | 3/26 | 48/151 | 84/90 | 101/162 | 61/126 |
| Single $CH_4$ uptake (298 K) (mg/g) at 1 bar | | 6.2 | 7.5 | 12.6 | 17.8 | 4.2 |
| Single $N_2$ uptake (298 K) (mg/g) at 1 bar | | 4.9 | 4.2 | 6.4 | na | 6.4 |
| Single $H_2$ uptake (298 K) (mg/g) at 1 bar | | nm | 0.2 | 1.37 | na | na |
| $CO_2$ uptake (298 K) in $CO_2/N_2$:10/90 mixture at 1 bar (mg/g) | | 8.4[a] | 70[a]/55[b] | 99.9[a]/104.4[d] | na | na |
| $CO_2$ uptake (298 K) in $CO_2/CH_4$:50/50 mixture at 1 bar (mg/g) | | 42.8[a] | 183[a]/138[b] | 108[a]/110[d] | na | na |
| $CO_2$ uptake (298 K) in $CO_2/H_2$:30/70 mixture at 1 bar (mg/g) | | nm | -/85[b] | -/112[e] | na | na |
| Selectivity at 1 bar | $CO_2/N_2$ | 13.7[a] | 140[a]/72[b] | 1818[a]/1700[d] | na | 420[a] |
| | $CO_2/CH_4$ | 5.3[a] | 33[a]/51[b] | 231[a]/350[d] | 137[a] | 103[a] |
| | $CO_2/H_2$ | nm | 240[b] | >1800 | 800[f] | na |

[a]IAST; [b]breakthrough experiments; [c]mixture gravimetric (G) experiment; [d]mixture gravimetric-densimetric gas analysis (GDGA) experiment; [e]due to the high error associated with $H_2$ adsorption measurements (very low uptake), quantitative measurement of $CO_2/H_2$ was not possible; [f]Long et al. 2011(313 K data); [g]Cavenati et al. 2004 (298 K data); na: not available; nm: not measured.

Figure 11:
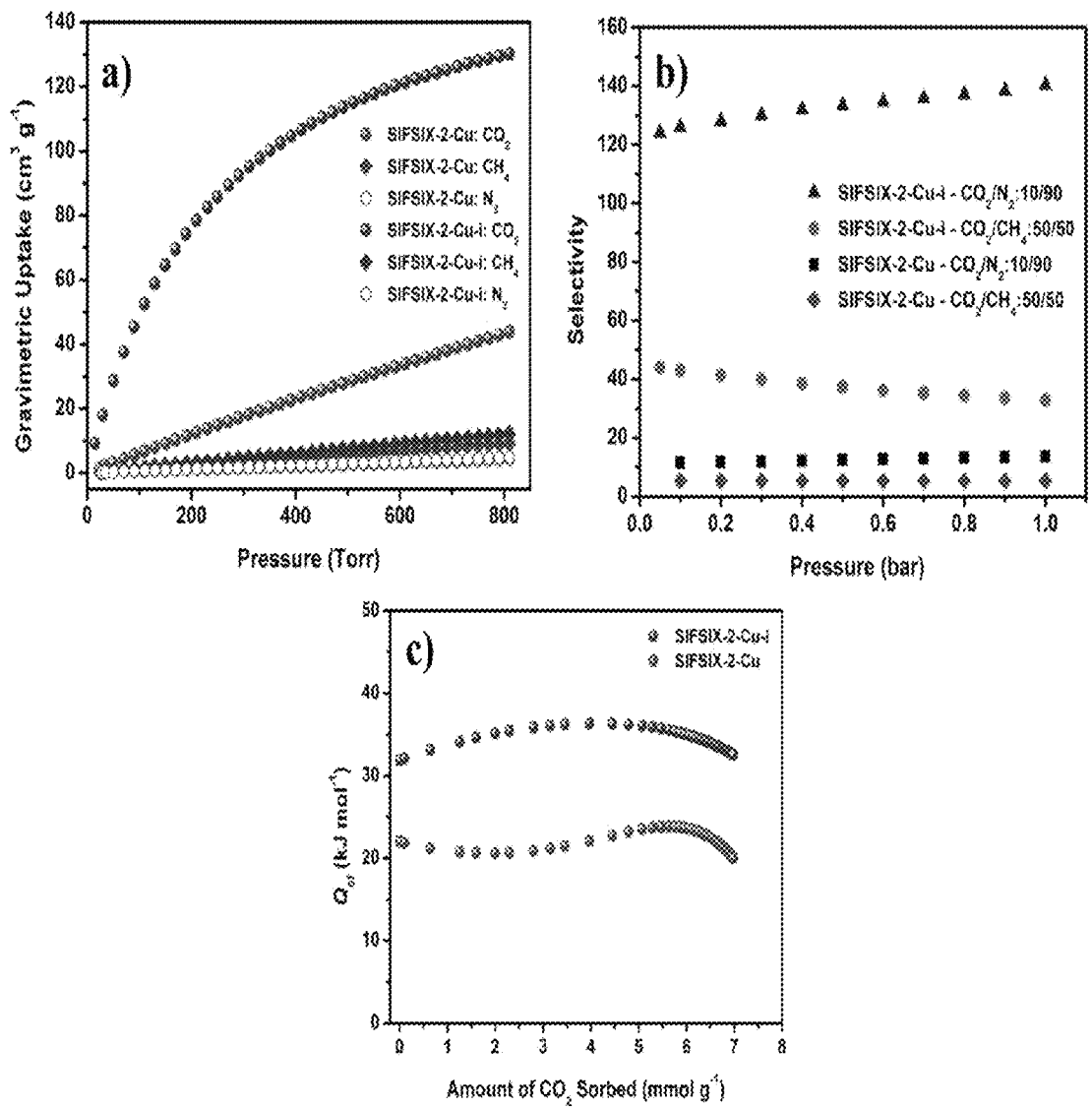
FIG. 11($a$) illustrates a graph showing low pressure isotherms at 298 K for SIFSIX-2-Cu (red) and SIFSIX-2-Cu-i (purple).
Figure 12:
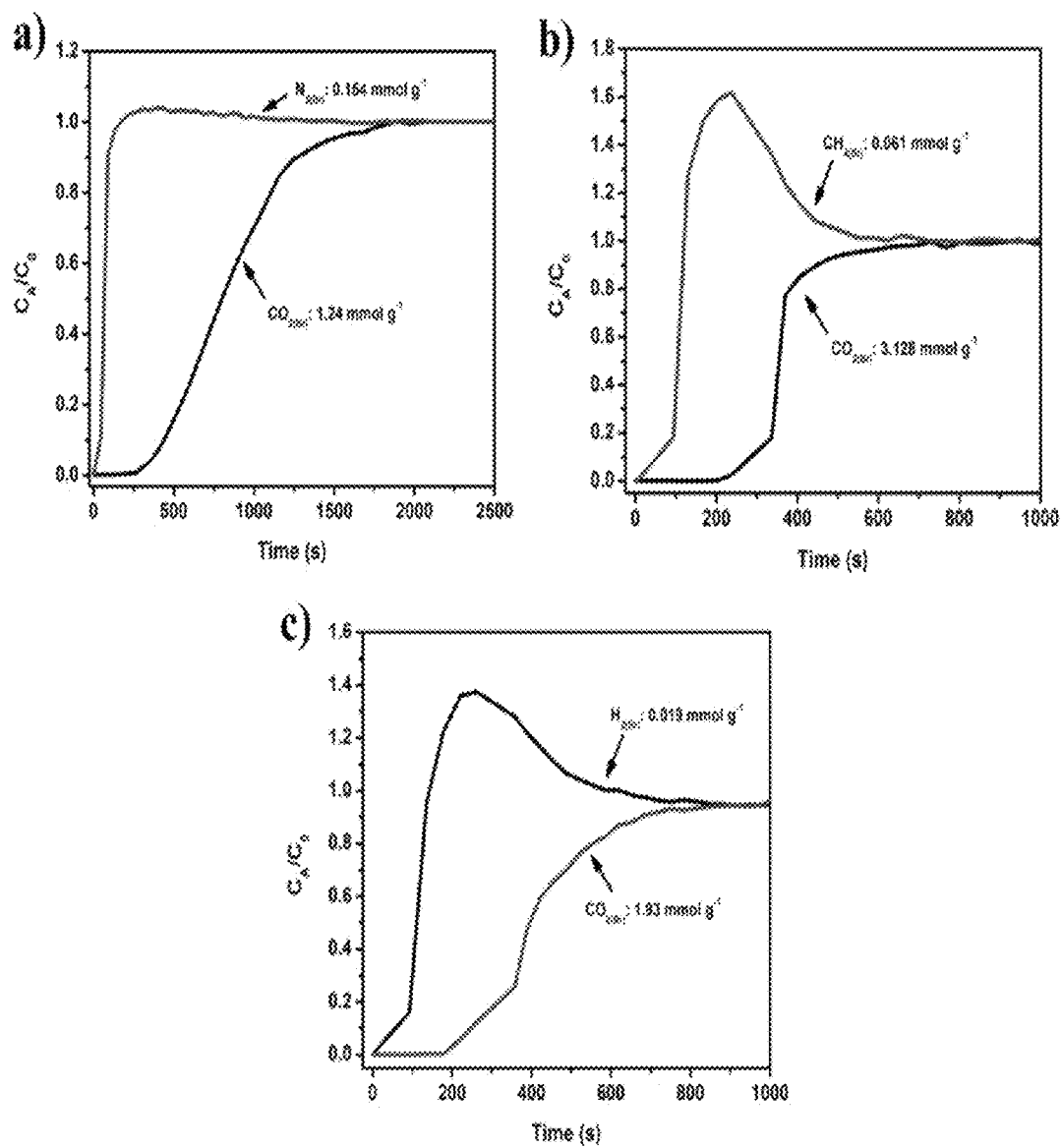
FIG. 12($a$) illustrates a graph showing a column breakthrough experiment of a $CO_2/N_2$:10/90 binary gas system at 298 K and 1 bar on SIFSIX-2-Cu-i.

Low pressure $CO_2$, $CH_4$, and $N_2$ sorption data were collected at 298 K (FIG. 11a, Table 1). SIFSIX-2-Cu exhibited $CO_2$ uptake of 41.4 $cm^3$ $g^{-1}$ (1.84 mmol $g^{-1}$; 81.3 mg $g^{-1}$) at 298 K and 1 bar but its denser polymorph, SIFSIX-2-Cu-i, exhibited substantially higher values of 121.2 $cm^3$ $g^{-1}$(5.41 mmol $g^{-1}$; 238 mg $g^{-1}$). Such behavior has also been observed in the context of hydrogen adsorption[19]. A review of the literature reveals that the gravimetric $CO_2$ uptake of SIFSIX-2-Cu-i at 298 K and 1 bar is among the highest yet reported (e.g. Mg-dobdc[10], Co-dobdc[10], MIL-101[20], [Cu(Me-4py-trz-ia)][21] and partially hydrated HKUST-1[22]). Notably, these MOMs possess higher surface area, are less dense than SIFSIX-2-Cu-i and contain UMCs. Volumetric $CO_2$ uptake of SIFSIX-2-Cu-i at atmospheric pressure approaches that of Mg-dobdc (151 vs. 163 v/v). Ideal Adsorbed Solution Theory (IAST)[23] calculations indicate binary gas adsorption selectivity (FIG. 11b) under practically relevant conditions (298 K; $CH_4$ and $N_2$ mole fractions equal to 0.5 and 0.9, respectively) to be dramatically higher for SIFSIX-2-Cu-i than SIFSIX-2-Cu for both $CO_2/CH_4$ (33 vs. 5.3) and $CO_2/N_2$ (140 vs. 13.7). These findings agree with the $CO_2/CH_4$ (51) and $CO_2/N_2$ (72) adsorption selectivity determined experimentally for SIFSIX-2-Cu-i using column breakthrough tests (FIG. 12). To the best of our knowledge, the $CO_2/CH_4$ and $CO_2/N_2$ IAST selectivity exhibited by SIFSIX-2-Cu-i are the highest yet reported for a MOM without UMCs or amino groups. We attribute these observations to the enhanced isosteric heat of adsorption ($Q_{st}$) of SIFSIX-2-Cu-i vs. SIFSIX-2-Cu (45% higher at minimum loading, 71.5% greater at 2.8 mmol $g^{-1}$, FIG. 11c). This increase is presumably attributable to better overlap of attractive potential fields of opposite walls in the relatively narrower pores of SIFSIX-2-Cu-i. SIFSIX-2-Cu-i is also suitable for $CO_2$ separation from syngas thanks to its $CO_2/H_2$:30/70 selectivity (240) as determined from column breakthrough experiments (FIG. 12c).

Figure 2:
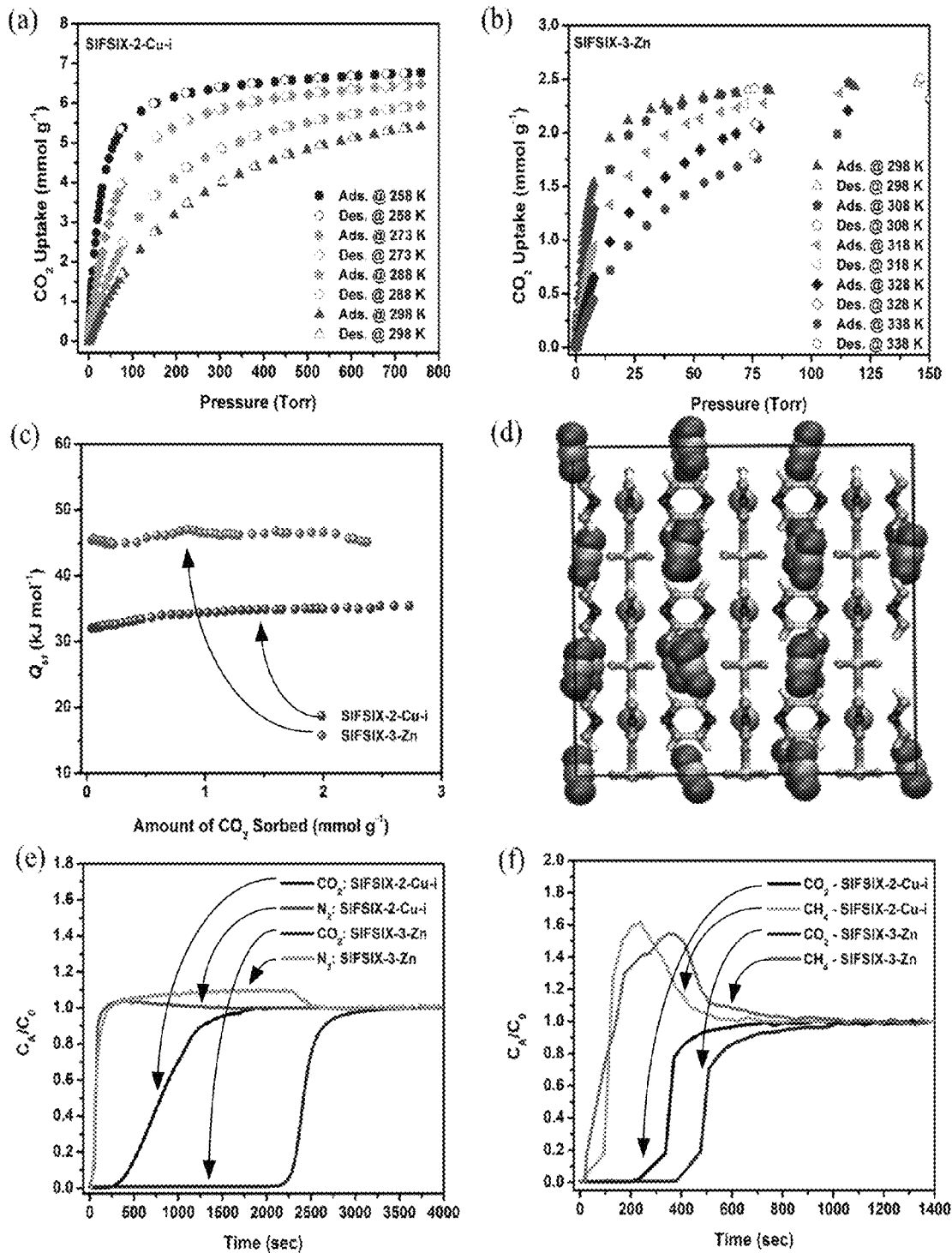
FIG. 2: (a) Variable temperature $CO_2$ sorption isotherms for SIFSIX-2-Cu-i and (b) SIFSIX-3-Zn; (c) $Q_{st}$ of $CO_2$ adsorption on SIFSIX-2-Cu-i and SIFSIX-3-Zn in the low pressure region; (d) The modeled structure of a 3×3 box of unit cells of SIFSIX-3-Zn reveals close interactions between the electropositive carbon atoms of $CO_2$ molecules and fluoride atoms of SIFSIX anions; (e) Column breakthrough experiment for $CO_2/N_2$:10/90 gas mixture (298 K, 1 bar) carried out on SIFSIX-2-Cu-i and SIFSIX-3-Zn; (f) Column breakthrough experiment for $CO_2/CH_4$:50/50 gas mixture (298 K, 1 bar) carried out on SIFSIX-2-Cu-i and SIFSIX-3-Zn.
Figure 13:
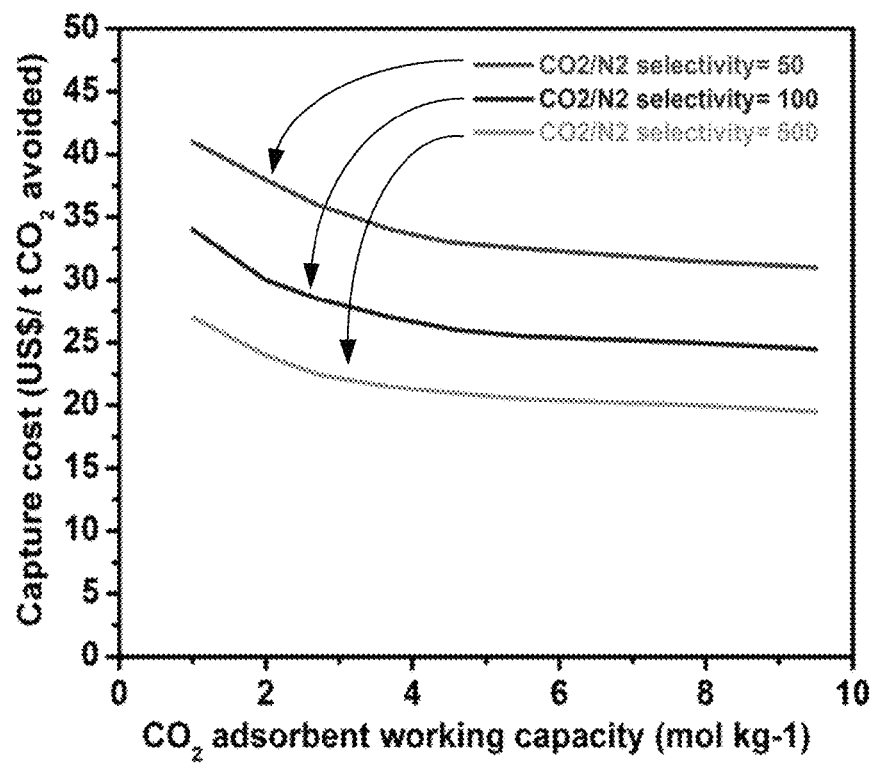
FIG. 13 illustrates a graph showing the relationship between cost of $CO_2$ capture, $CO_2$ selectivity, and working $CO_2$ capacity for solid sorbents.
Figure 14:
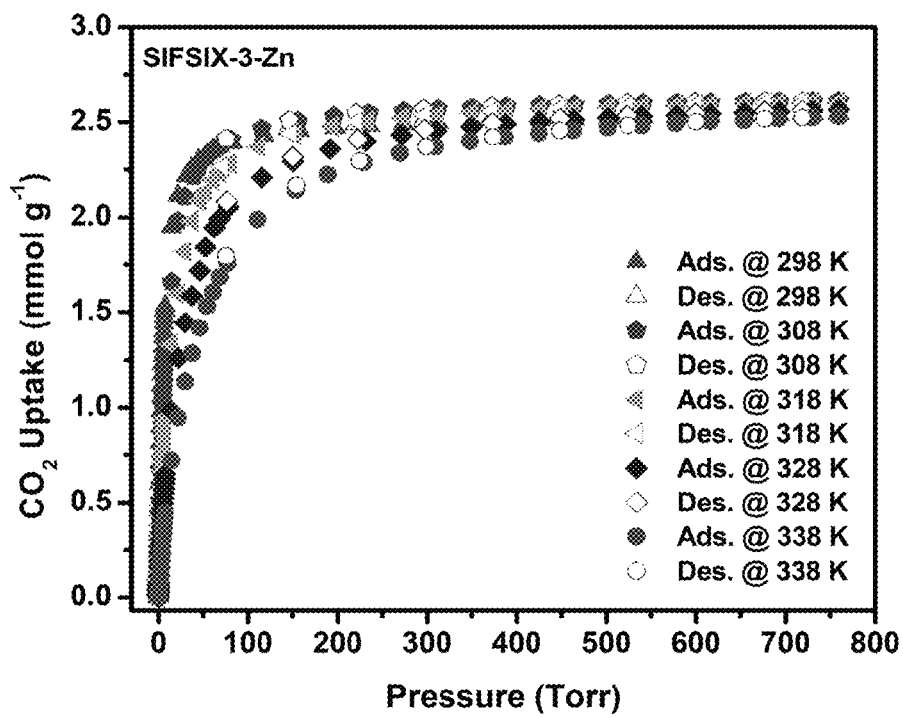
FIG. 14 illustrates a graph showing low pressure, variable temperature $CO_2$ isotherms for SIFSIX-3-Zn.
Figure 15:
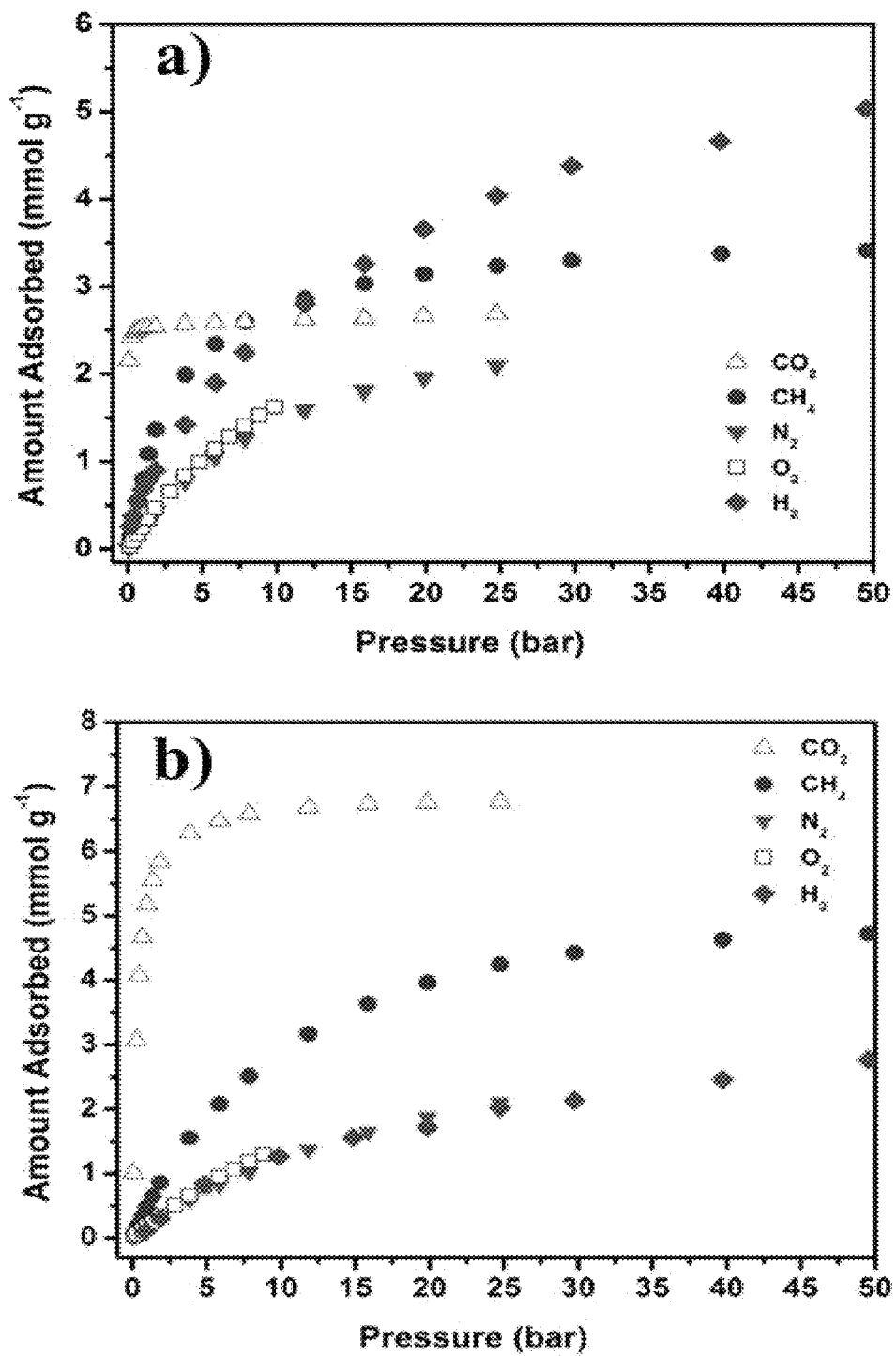
FIGS. 15($a$) and ($b$) illustrates graphs showing high pressure single gas $CO_2$, $N_2$, $CH_4$, $O_2$, and $H_2$ adsorption isotherms for SIFSIX-3-Zn and SIFSIX-2-Cu-I, respectively.
Figure 29:
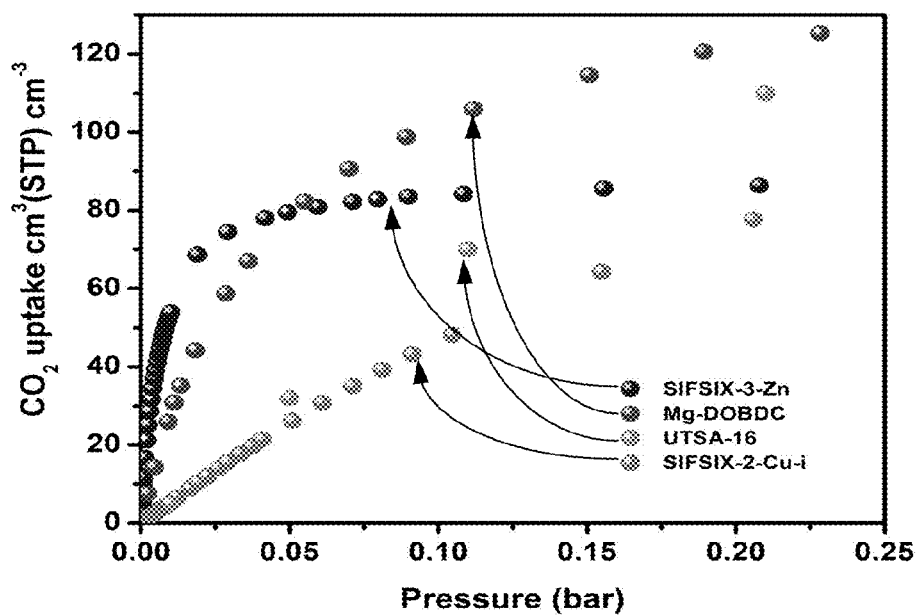
FIG. 29 illustrates a graph showing $CO_2$ volumetric adsorption capacity at low pressure (0-0.25 bar) and 298 K for SIFSIX-3-Zn, Mg-dobdc (313 K), UTSA-16 and SIFSIX-2-Cu-i.

The heart of pressure and temperature swing adsorption processes (PSA and TSA) for $CO_2$ removal is the adsorbent bed and a recent study projected that a $CO_2/N_2$ selectivity of >500 combined with a capacity of 2 to 4 mmolg$^{-1}$ for a $CO_2/N_2$:10/90 mixture would be required for practical utility (FIG. 13).[24] FIGS. 2a and 2b present the $CO_2$ adsorption isotherms of SIFSIX-2-Cu-i and SIFSIX-3-Zn, respectively, collected at sub-atmospheric pressures after activation at 298 K. Contraction of the pores led to a sharp increase in $CO_2$ uptake at low $CO_2$ loading with nearly 11 wt % at 0.1 bar for SIFSIX-3-Zn vs. 4.4 wt % at 0.1 bar for SIFSIX-2-Cu-i. Notably, the $CO_2$ uptake for SIFSIX-3-Zn reached saturation at relatively low pressures (ca. 0.3 bar; FIG. 14) while the $CO_2$ adsorption isotherm on SIFSIX-2-Cu-i reached a plateau at relatively higher pressures (5-7 bar) (FIG. 15b). As a result, SIFSIX-3-Zn exhibits high volumetric $CO_2$ uptake that is comparable to those of Mg-dobdc[10] and UTSA-16[25] at a $CO_2$ partial pressure typical for post-combustion $CO_2$ capture (FIG. 29).

FIG. 2c presents the $Q_{st}$ of $CO_2$ adsorption for SIFSIX-2-Cu-i and SIFSIX-3-Zn from variable temperature isotherms (FIG. 2a, b) and the $Q_{st}$ of up to 45 kJ mol$^{-1}$ is consistent with the steepness of the $CO_2$ isotherms. The relatively constant $Q_{st}$ indicates homogenous binding sites over the full range of $CO_2$ loading (FIG. 2c). These $Q_{st}$ values are in the "sweet spot" favorable for efficient, reversible adsorption-desorption, i.e. strong but still reversible and are supported by modeling studies (FIGS. 2d, 31-33).

The $CO_2$ selectivity of SIFSIX-3-Zn was investigated via column breakthrough tests using binary $CO_2/N_2$:10/90 (FIG. 2e) and $CO_2/CH_4$:50/50 gas mixtures (FIG. 2f) at 298 K and atmospheric pressure and compared to the corresponding breakthrough tests on SIFSIX-2-Cu-i. Remarkably, SIFSIX-3-Zn showed much higher selectivity (495 and 109 for $CO_2/N_2$:10/90 and $CO_2/CH_4$:50/50, respectively) than SIFSIX-2-

Cu-i as $CO_2$ was retained for longer times (e.g., ca. 2000 sec vs. 300 sec for $CO_2/N_2$). Markedly, $N_2$ and $CH_4$ breakthrough occurred within seconds. In order to support and confirm the high selectivity derived from the breakthrough experiments, single gas ($CO_2$, $N_2$, $CH_4$ and $H_2$) sorption isotherms were conducted at low and high pressures and IAST calculations were used to predict $CO_2/CH_4$:05/95, $CO_2/CH_4$:50/50, $CO_2/N_2$:10/90 and $CO_2/H_2$:30/70 binary mixture adsorption equilibria. These mixtures mimic natural gas upgrading, biogas treatment, post- and pre-combustion capture applications, respectively.

Gas Mixture Adsorption Studies. FIGS. 3a and 3b reveal that the $CO_2$ adsorption selectivity of SIFSIX-3-Zn calculated for binary gas separation vs. $CH_4$ and $N_2$ is unprecedented, outperforming Mg-dobdc[10], UTSA-16[25], and zeolite 13X[26]. Indeed, SIFSIX-3-Zn compares to amine-functionalized MOFs[27] and amine-bearing mesoporous silica[28], particularly at low $CO_2$ partial pressure. The extraordinary calculated selectivity for $CO_2/N_2$ (i.e. 1539±307 at 1 bar and 298 K) was validated by gas mixture gravimetric adsorption experiments at various pressures (FIG. 3c, d).

Figure 16:
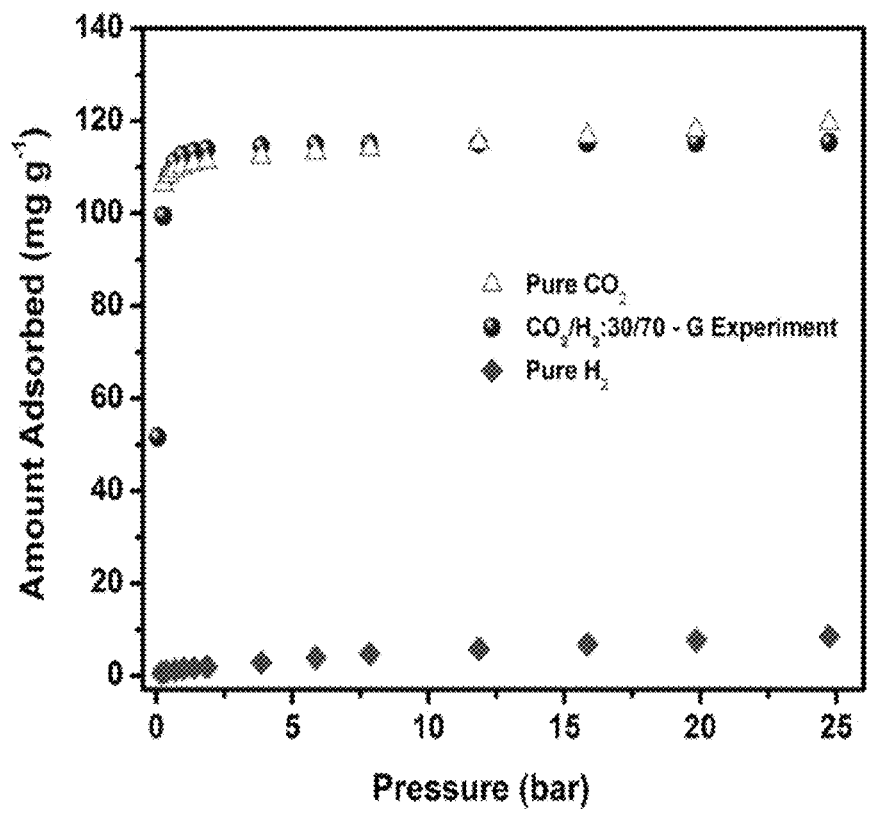
FIG. 16 illustrates a graph showing the experimental $CO_2/H_2$:30:70 adsorption isotherms as compared to experimental pure $CO_2$ and $H_2$ isotherms at 298 K for SIFSIX-3-Zn.
Figure 17:
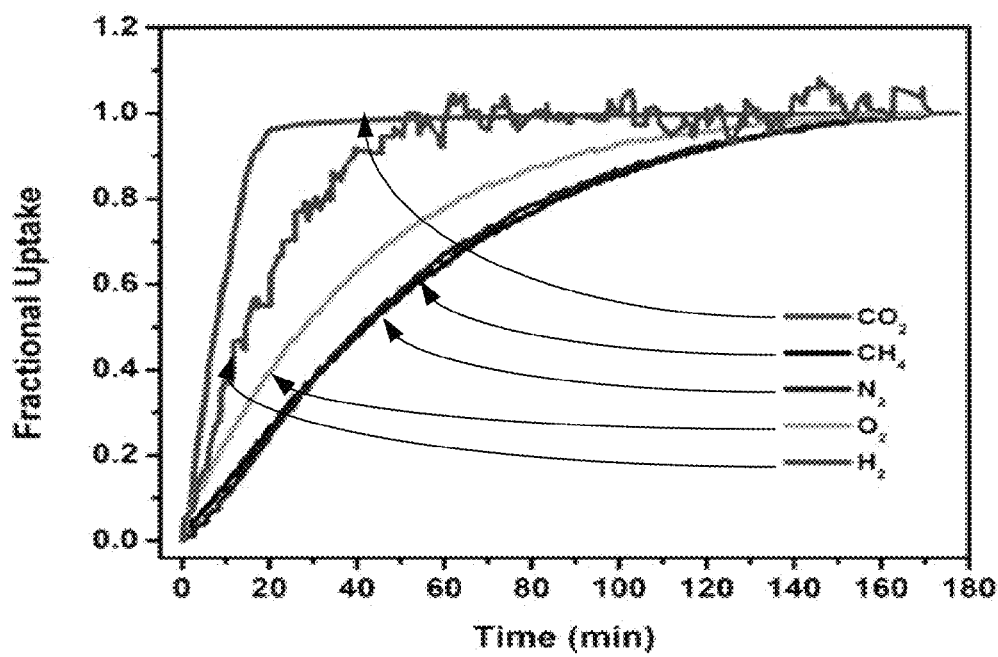
FIG. 17 illustrates a graph showing the fractional uptake of $CO_2$, $N_2$, $CH_4$ and $H_2$ on SIFSIX-3-Zn at 0.5 bar and 298 K.

With regards to $CO_2/H_2$ mixtures, adsorption isotherms of $CO_2/H_2$:30/70 were collected and showed similar shape and uptake to that obtained using pure $CO_2$ (FIG. 16). This indicates that SIFSIX-3-Zn adsorbs $CO_2$ with very large selectivity over $H_2$ containing mixtures (higher than 1800), making it potentially suitable for pre-combustion capture or $H_2$ purification. Because of the large error associated with $H_2$ adsorption measurement (relatively low uptake) quantitative measurements of $CO_2/H_2$ selectivity was not possible. We note that calculated and measured selectivity exceeding 1000 are often subject to uncertainties associated with measurement of the gas uptake of weakly adsorbed gases. Therefore, it would be inappropriate in this case to make quantitative comparisons between different adsorbents such as SIFSIX-3-Zn and Mg-dobdc[29] (800 at 1 bar and 313 K).

Figure 3:
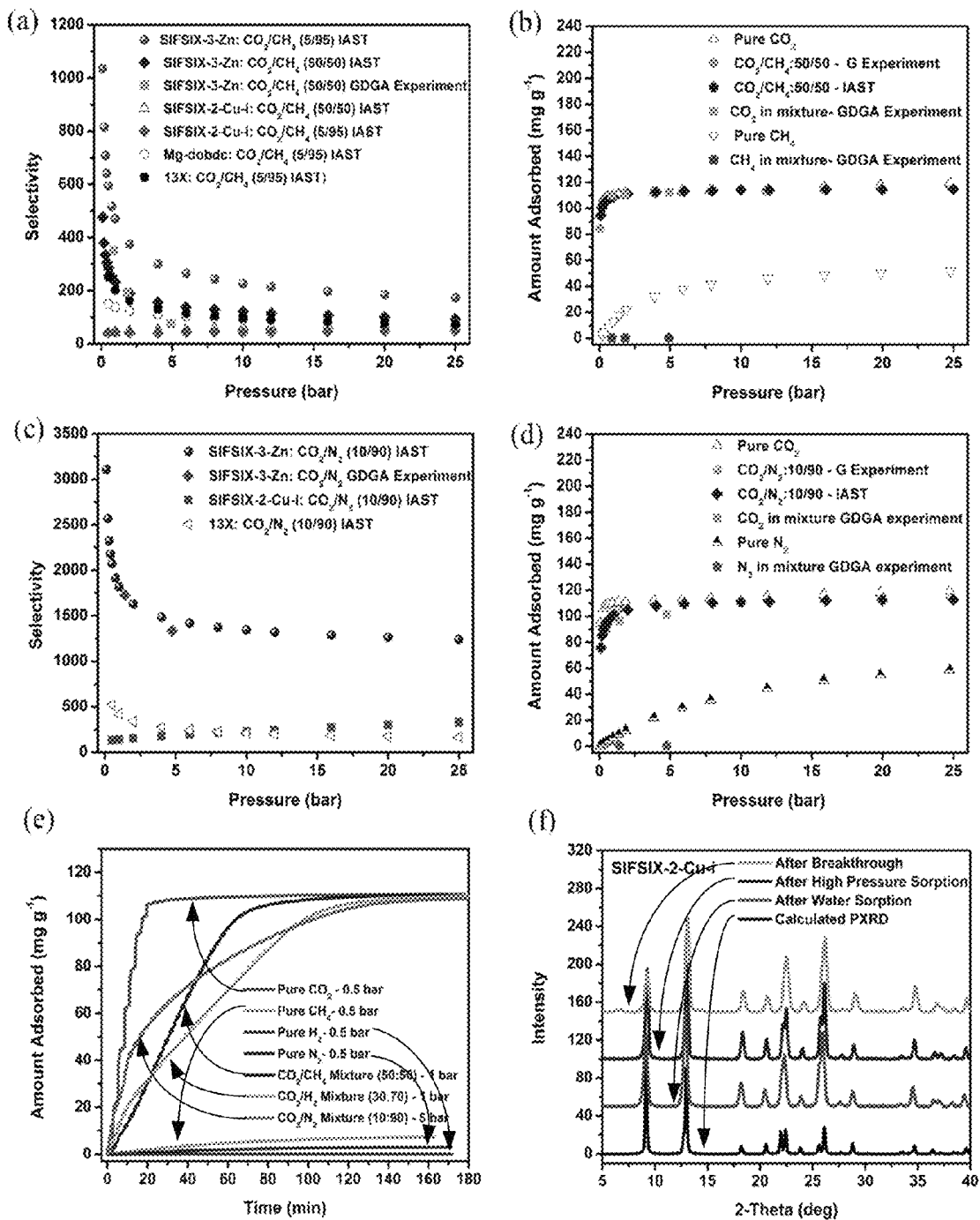
FIG. 3: (a) IAST $CO_2$ adsorption selectivity for a $CO_2/CH_4$ mixture on SIFSIX-2-Cu-i and SIFSIX-3-Zn vs. Mg-dobdc and 13X zeolite at 298K. Experimental data using gravimetric-densimetric-gas analysis is provided for comparison; (b) IAST $CO_2/CH_4$:50:50 adsorption isotherm prediction compared to experimental pure $CO_2$, $CH_4$ and $CO_2/CH_4$:50:50 gas mixture adsorption isotherms collected for SIFSIX-3-Zn at 298 K; (c) $CO_2$ adsorption selectivity of SIFSIX-2-Cu-i, SIFSIX-3-Zn and 13X zeolite for $CO_2/N_2$:10:90 as calculated using IAST at 298 K; (d) IAST $CO_2/N_2$:10:90 adsorption isotherm predictions compared to experimental pure $CO_2$, $N_2$ and $CO_2/N_2$:10:90 gas mixture adsorption isotherms collected for SIFSIX-3-Zn at 298 K; (e) Kinetics of adsorption of SIFSIX-3-Zn for pure gases and gas mixtures containing various compositions of $CO_2$; (f) PXRD patterns of SIFSIX-2-Cu-i after multiple cycles of breakthrough tests, high pressure sorption, and water sorption experiments (compared to the calculated pattern).
Figure 4:
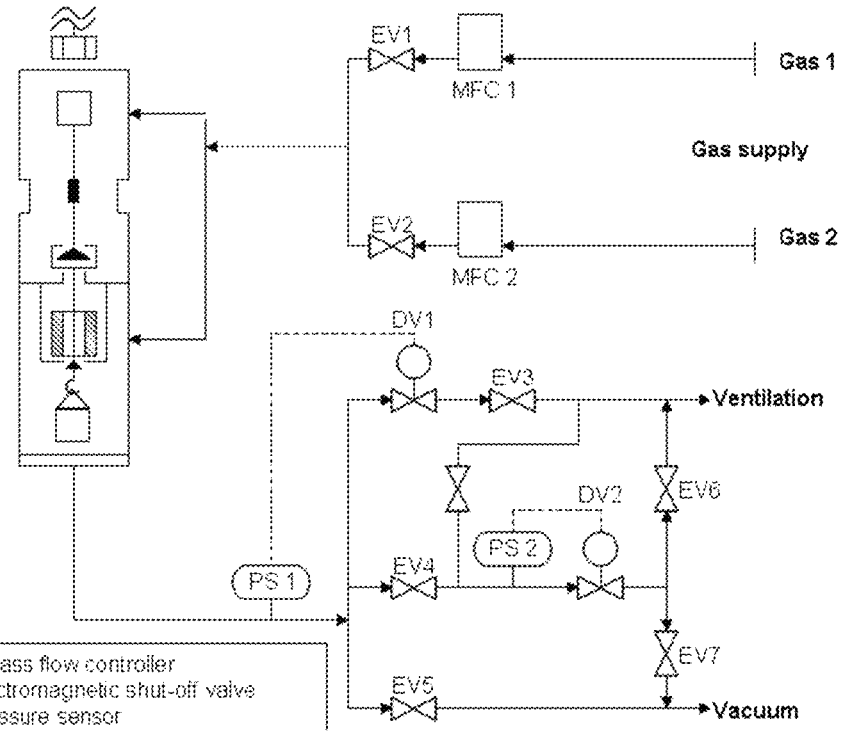
FIG. 4 illustrates a scheme of a representation of the Rubotherm gravimetric-densimetric apparatus.
Figure 5:
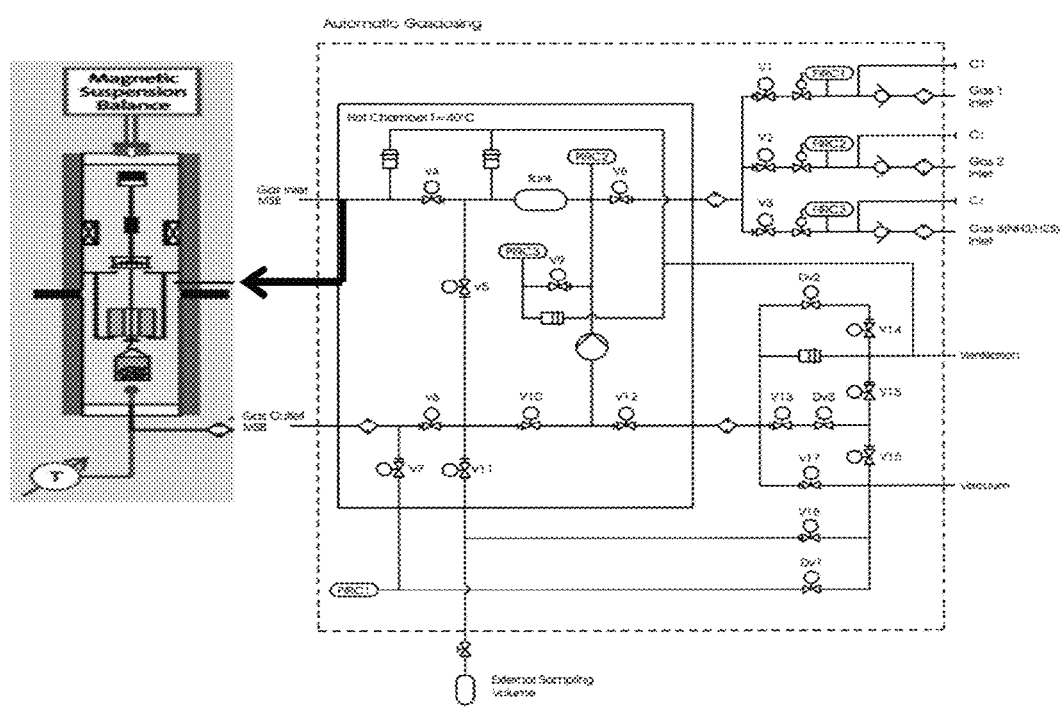
FIG. 5 illustrates a scheme of a representation of the Rubotherm gravimetric-densimetric-gas analysis (GDGA) apparatus for mixture gas adsorption at low and high pressure.
Figure 6:
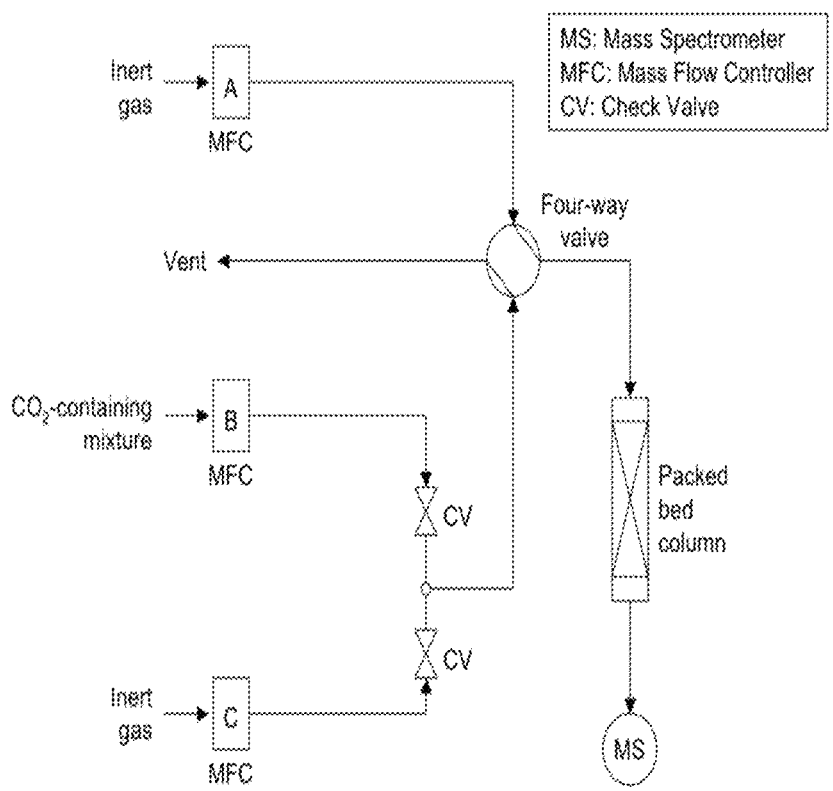
FIG. 6 illustrates a scheme representation of the column breakthrough experiment.

In order to confirm the synergistic nature of the thermodynamics and kinetics for $CO_2$ capture, competitive adsorption kinetic studies using the above gas mixtures were conducted and are presented in FIG. 3e. Interestingly, the uptake at equal times for $CO_2/N_2$, $CO_2/CH_4$ and $CO_2/H_2$ mixtures follow the behavior of pure $CO_2$. In addition, at equilibrium the total uptake of the $CO_2$ containing gas mixtures overlay perfectly with the equilibrium uptake for pure $CO_2$. These unprecedented findings show that when $CO_2$ containing mixtures are contacted with SIFSIX-3-Zn, $CO_2$ adsorbs more strongly and faster than $N_2$, $O_2$, $CH_4$ and $H_2$, thus occupying all the available space and sorption sites and consequently excluding other gases. Most importantly, SIFSIX-3-Zn fulfills the demanding attributes (FIG. 13) required for economical and efficient $CO_2$ post-combustion separation. Further, increasing the adsorption temperature did not significantly reduce the steepness of the $CO_2$ adsorption isotherm for SIFSIX-3-Zn (FIG. 2b, 14), a desirable feature in many $CO_2$ separation and purification applications.

Recyclability and Effect of Moisture.

Figure 20:
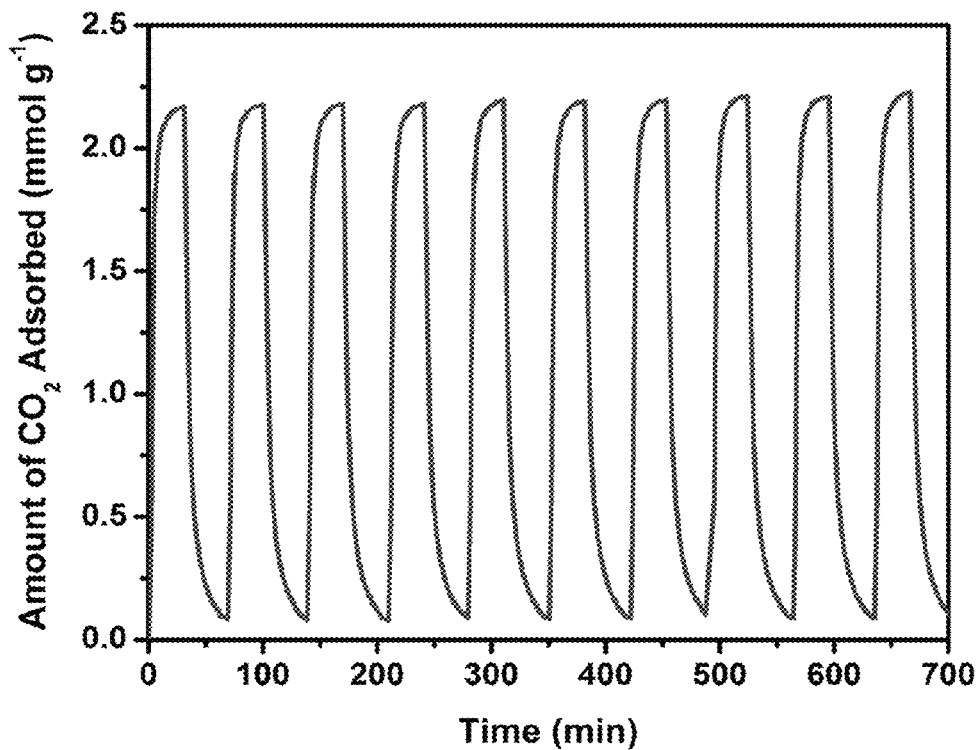
FIG. 20 illustrates a graph showing the cyclic CO2 adsorption on SIFSIX-3-Zn using vacuum swing regeneration mode at 323 K and 0.15 bar.
Figure 21A:
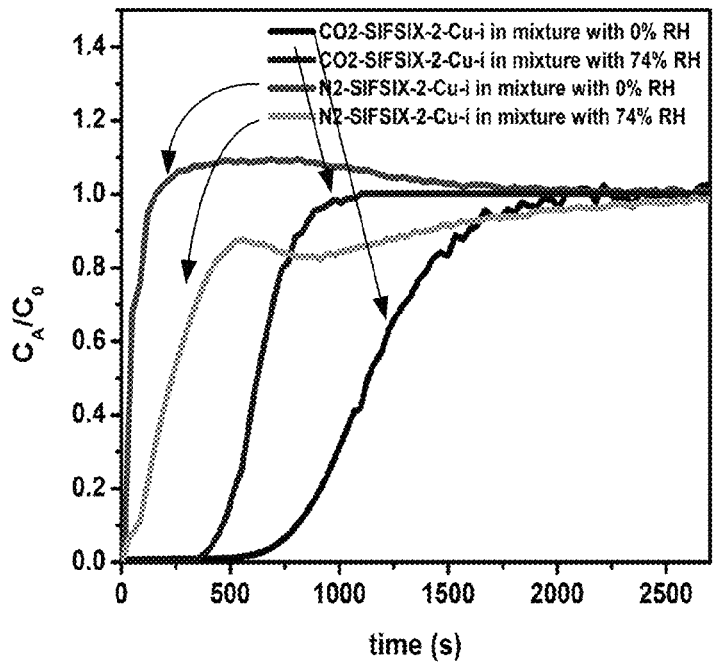
FIG. 21($a$) is a graph that illustrates an example of one cycle column breakthrough experiment for $CO_2/N_2$:10/90 binary gas systems at 298 K and 1 bar under dry conditions and in the presence of 74% RH carried out on SIFSIX-2-Cu-i.
Figure 21B:
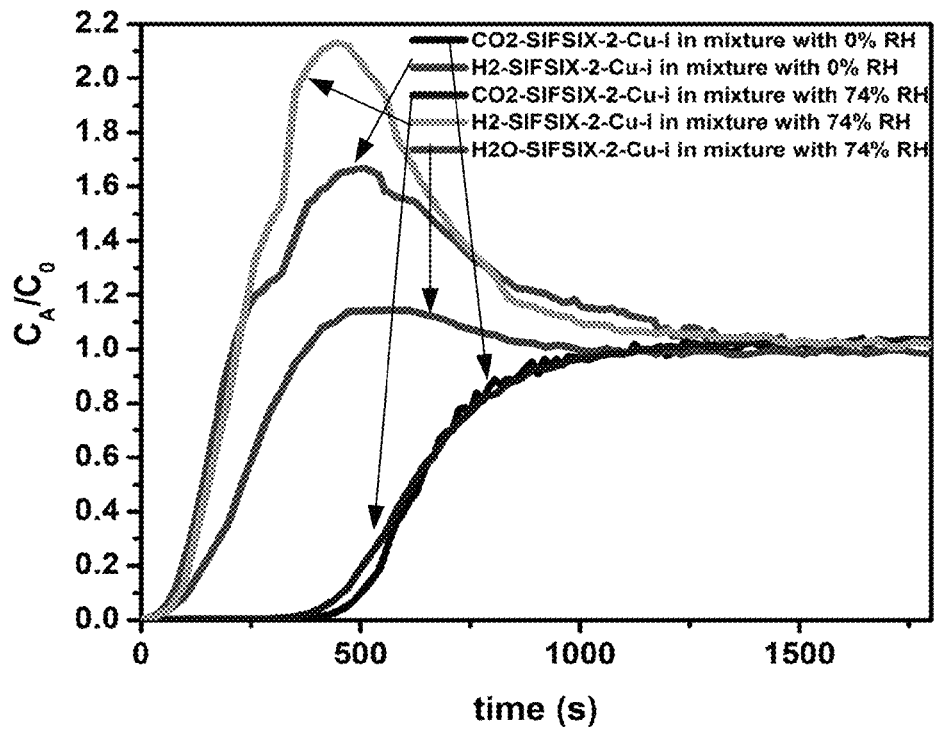
Figure 22A:
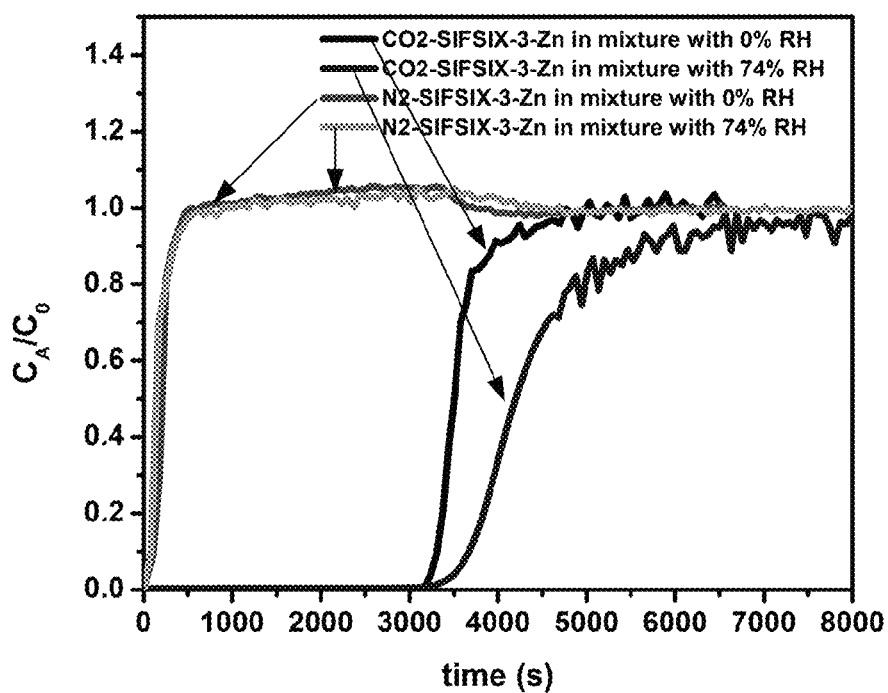
FIG. 22($a$) illustrates an example of one cycle column breakthrough experiment for $CO_2/N_2$:10/90 binary gas system at 298 K and 1 bar under dry conditions and in the presence of 74% RH carried out on SIFSIX-3-Zn.
Figure 22B:
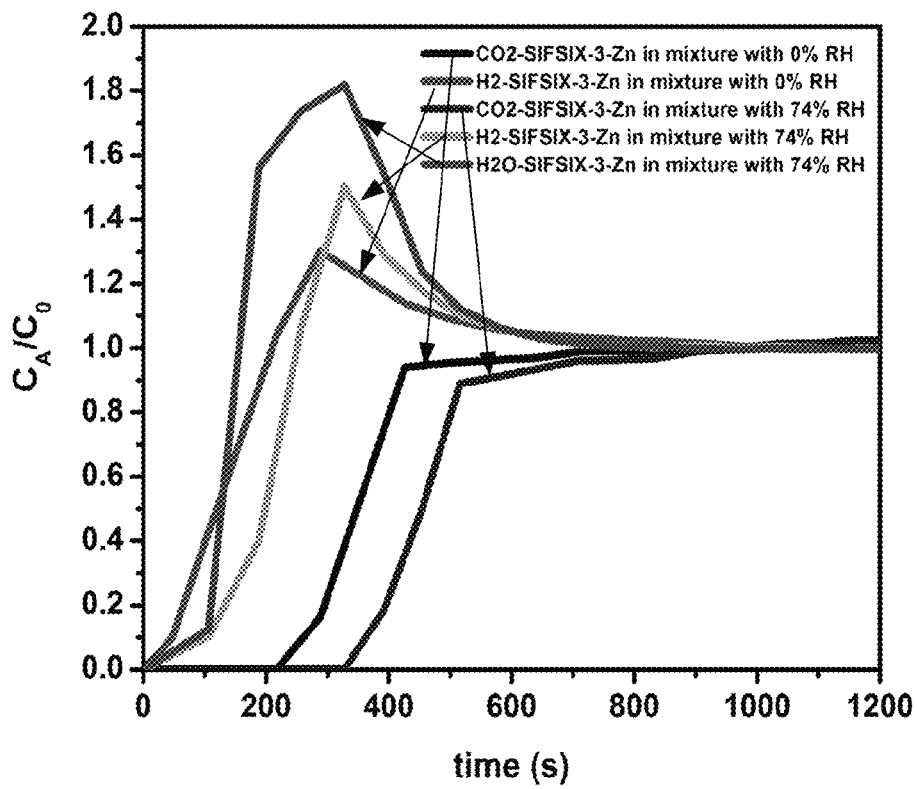
Figure 30:
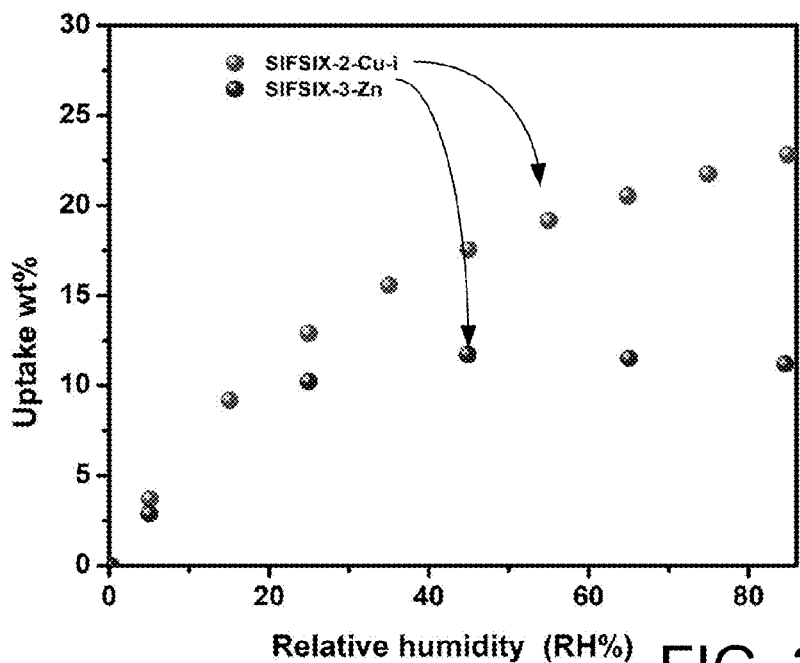
FIG. 30 illustrates a graph showing water adsorption isotherm on SIFSIX-2-Cu-I and SIFSIX-3-Zn at 298 K after activation at 323 K.
Figure 31:
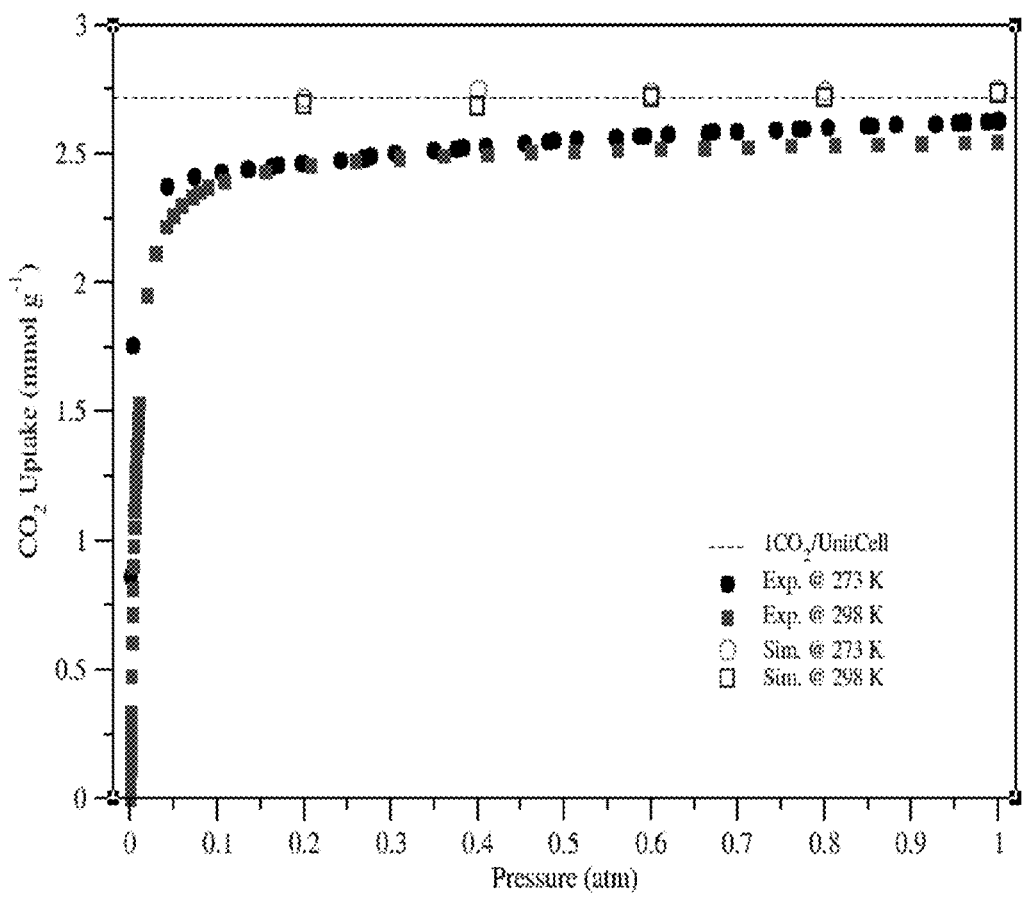
FIG. 31 illustrates a graph showing GCMC-generated $CO_2$ sorption isotherms for SIFSIX-3-Zn.

Whereas the sorbents reported herein exhibit exceptional performance with respect to $CO_2$ selectivity, their amenability to recycling and efficacy in the presence of moisture must also be addressed. Recyclability was validated via adsorption-desorption cycle experiments conducted at 323 K and 0.15 bar (FIG. 20). The impact of water vapor on the $CO_2$ capacity and selectivity for SIFSIX-2-Cu-i and SIFSIX-3-Zn was evaluated via a series of adsorption measurements. Water vapor adsorption isotherms are type I isotherms with uptakes of 20 wt % and 11 wt %, respectively, at 74% RH (FIG. 30). Water adsorption affinity/capacity is reduced in the presence of $CO_2$ gas mixtures as revealed by breakthrough experiments, especially for SIFSIX-3-Zn (FIGS. 21b and 22b). Importantly, the presence of water in the given gas mixture had a negligible effect at elevated $CO_2$ concentrations (FIG. 21b) in the case of SIFSIX-2-Cu-i. Regarding the $CO_2/H_2$: 30/70 mixture, $CO_2$ uptake and selectivity were only slightly reduced in the presence of moisture (1.61 mmol/g and 191 at 74% RH vs. 1.99 mmol/g and 237 at 0% RH for SIFSIX-2-Cu-i, FIG. 21b). Whereas SIFSIX-2-Cu-i was structurally unchanged by exposure to moisture (FIG. 3f), SIFSIX-3-Zn undergoes a reversible phase change at relatively high humidity (FIGS. 25-28).

In conclusion, we demonstrate how a crystal engineering or reticular chemistry approach to pore size control coupled with favorable electrostatics from an array of inorganic anions affords porous materials with exceptional selectivity, recyclability and moisture stability in the context of several industrially relevant $CO_2$ separation applications. In effect, the structural features and exceptional mixed gas sorption properties of the SIFSIX compounds reported herein reveal that is now possible to combine equilibrium[10,11,26] and kinetic[30] adsorption selectivity in the same porous material to facilitate effective $CO_2$ separation and capture.

References, each of which is incorporated herein by reference:

1. Energy Technology Perspectives 2010-Scenarios and Strategies to 2050 (executive summary). International Energy Agency, Paris (2010).
2. Merel, J., Clausse, M. & Meunier, F. Experimental investigation on $CO_2$ post-combustion capture by indirect thermal swing adsorption using 13X and 5A zeolites. *Ind. Eng. Chem. Res.* 47, 209-215 (2008).
3. MacGillivray, L. R. *Metal-Organic Frameworks: Design and Application*. (John Wiley & Sons, 2010).
4. Li, H., Eddaoudi, M., O'Keeffe, M. & Yaghi, O. M. Design and synthesis of an exceptionally stable and highly porous metal-organic framework. *Nature* 402, 276-279 (1999).
5. Eddaoudi, M. et al. Systermatic design of pore size and functionality in isoreticular MOFs and their application in methane storage. *Science* 295, 469-472 (2002).
6. Farha, O. K. et al. Metal-organic framework materials with ultrahigh surface areas: Is the sky the limit? *J. Am. Chem. Soc.* 134, 15016-1502 (2012).
7. Moulton, B. & Zaworotko, M. J. From molecules to crystal engineering: Supramolecular isomerism and polymorphism in network solids. *Chem. Rev.* 101, 1629-1658 (2001).
8. Kitagawa, S., Kitaura, R. & Noro, S. Functional porous coordination polymers. *Angew. Chem. Int. Ed.* 43, 2334-2375 (2004).
9. Yaghi, O. M. et al. Reticular Synthesis and the Design of New Materials. *Nature* 423, 705-714 (2003).
10. Caskey, S. R., Wong Foy, A. G. & Matzger, A. J. Dramatic tuning of carbon dioxide uptake via metal substitution in a coordination polymer with cylindrical pores. *J. Am. Chem. Soc.* 130, 10870-10871 (2008).
11. Sumida, K. et al. Carbon dioxide capture in metal-organic frameworks. *Chem. Rev.* 112, 724-781 (2012).
12. Kizzie, A. C., Wong Foy, A. G. & Matzger, A. J. Effect of humidity on the performance of microporous coordination polymers as adsorbents for $CO_2$ capture. *Langmuir* 27, 6368-6373 (2011).
13. Subramanian, S. & Zaworotko, M. J. Porous solids by design —[Zn(4,4'-bpy)$_2$(SiF$_6$)$_n$]-xDMF, a single framework octahedral coordination polymer with large square channels. *Angew. Chem. Int. Ed.* 34, 2127-2129 (1995).

14. Noro, S., Kitagawa, S., Kondo, M. & Seki, K. A new methane adsorbent, porous coordination polymer [CuSiF$_6$ (4,4'-bipyridine)$_2$], *Angew. Chem. Int. Ed.* 39, 2081-2084 (2000).
15. Burd, S. D. et al. Highly selective carbon dioxide uptake by [Cu(bpy-n)$_2$(SiF$_6$)](bpy-1=4,4'-bipyridine; bpy-2=1,2-bis(4-pyridyl)ethene). *J. Am. Chem. Soc.* 134, 3663-3666 (2012).
16. Coe, B. J. et al. Syntheses, spectroscopic and molecular quadratic nonlinear optical properties of dipolar ruthenium (II) complexes of the ligand 1,2-phenylenebis(dimethylarsine). *Dalton Trans.*, 2935-2942 (2004).
17. Uemura, K., Maeda, A., Maji, T. K., Kanoo, P. & Kita, H. Syntheses, crystal structures and adsorption properties of ultramicroporous coordination polymers constructed from hexafluorosilicate ions and pyrazine. *Eur. J. Inorg. Chem.*, 2329-2337 (2009).
18. Jagiello, J. & Thommes, M. Comparison of DFT characterization methods based on N$_2$, Ar, CO$_2$, and H$_2$ adsorption applied to carbons with various pore size distributions. *Carbon* 42, 1227-1232 (2004).
19. Ma, S. et al. Framework-catenation isomerism in metal-organic frameworks and its impact on hydrogen uptake. *J. Am. Chem. Soc.* 129, 1858-1859 (2007).
20. Llewellyn, P. L. et al. High uptakes of CO$_2$ and CH$_4$ in mesoporous metal-organic frameworks MIL-100 and MIL-101. *Langmuir* 24, 7245-7250 (2008).
21. Lassig, D. et al. A microporous copper metal-organic framework with high H$_2$ and CO$_2$ adsorption capacity at ambient pressure. *Angew. Chem.* 123, 10528-10532 (2011).
22. Yazaydin, A. O. et al. Enhanced CO$_2$ adsorption in metal-organic frameworks via occupation of open-metal sites by coordinated water molecules. *Chem. Mater.* 21, 1425-1430 (2009).
23. Myers, A. L. & Prausnitz, J. M. Thermodynamics of mixed-gas adsorption. *AIChE J.* 11, 121-127 (1965).
24. Ho, M. T., Allinson, G. W. & Wiley, D. E. Reducing the cost of CO$_2$ capture from flue gases using pressure swing adsorption. *Ind. Eng. Chem. Res.* 47, 4883-4890 (2008).
25. Xiang, S. et al. Microporous metal-organic framework with potential for carbon dioxide capture at ambient conditions. *Nat. Commun.* 3, 954 doi: 10.1038/ncomms1956 (2012).
26. Cavenati, S., Grande, C. A. & Rodrigues, A. E. Adsorption equilibrium of methane, carbon dioxide, and nitrogen on zeolite 13X at high pressures. *J. Chem. Eng. Data.* 49, 1095-1101 (2004).
27. Vaidhyanathan, R. et al. Direct observation and quantification of CO$_2$ binding within an amine-functionalized nanoporous solid. *Science* 330, 650-653 (2010).
28. Belmabkhout, Y., Serna-Guerrero, R. & Sayari, A. Adsorption of CO$_2$-containing gas mixtures over amine-bearing pore-expanded MCM-41 silica: Application for gas purification. *Ind. Eng. Chem. Res.* 49, 359-365 (2010).
29. Herm, Z. R., Swisher, J. A., Smit, B., Krishna, R. & Long, J. R. Metal-organic frameworks as adsorbents for hydrogen purification and precombustion carbon dioxide capture. *J. Am. Chem. Soc.* 133, 5664-5667 (2011).
30. Han, S. et al. High-throughput screening of metal-organic frameworks for CO$_2$ separation. *ACS Comb. Sci.* 14, 263-267 (2012).

Supplemental Information for Example 1:

1—Ligand and MOM Synthesis:

All chemicals with the exception of 1,2-bis(4-pyridyl) acetylene (dpa) were obtained commercially and used as received without further purification. Synthesis of dpa was accomplished by minor modification of a previously reported procedure.[1] 1,2-bis(4-pyridyl)acetylene, dpa:

Br$_2$ (3.5 mL, 10.8 g, 68 mmol) was added dropwise to a stirred solution of trans-1,2-bis(4-pyridyl)ethylene (3.52 g, 19.3 mmol) in HBr (48%, 46.5 mL) at 0° C. The mixture was stirred at 120° C. for 2 hours and subsequently cooled to room temperature yielding an orange precipitate. After chilling in ice for 30 min. the solid was filtered, washed with water, and then stirred in aqueous NaOH (2 M, 120 mL) for 30 min. The resulting white solid, 1,2-dibromo-1,2-bis(4-pyridyl)ethane, was filtered, washed with 250 mL of water, and dried under vacuum for 24 hours (yield 5.1 g, 77%). Finely cut Na (2.2 g, 96 mmol) was stirred in t-BuOH (120 mL, dried over 4 Å molecular sieves) at 80° C. under nitrogen until dissolution (20 hrs.). 1,2-dibromo-1,2-bis(4-pyridyl)ethane (4.0 g, 11.7 mmol) was added in portions and the mixture was stirred under nitrogen at 80° C. for 4 hrs. The mixture was next cooled to room temperature and EtOH was added (20 mL), followed by water (20 mL, CAUTION!). The brown solution was extracted with CHCl$_3$ until the extracts became colorless (ca. 4×70 mL) and then the CHCl$_3$ was evaporated to give a brown solid, which was recrystallized from toluene (overall yield 43%).

SIFSIX-2-Cu, {[Cu(dpa)$_2$(SiF$_6$)]$_n$}

Synthesis: Room temperature diffusion of an ethanol solution of dpa (2 mL, 0.115 mmol) into an ethylene glycol solution of CuSiF$_6$ (2 mL, 0.149 mmol) produced purple rod-shaped crystals of SIFSIX-2-Cu after 2 weeks in 87.4% yield (based on dpa).

SIFSIX-2-Cu-i, {[Cu(dpa)$_2$(SiF$_6$)]$_n$.2.5CH$_3$OH}

Synthesis: Blue plate single crystals of SIFSIX-2-Cu-i were synthesized in 99.8% yield (based on dpa) by room temperature diffusion of a methanol solution of CuSiF$_6$ (2 mL, 0.149 mmol) into a DMSO solution of dpa (2 mL, 0.115 mmol) for 1 week. An alternative direct mixing method was used to produce powdered samples of SIFSIX-2-Cu-i. A methanol solution of dpa (4 mL, 0.270 mmol) was stirred with an aqueous solution of CuSiF$_6$ (4 mL, 0.258 mmol) resulting in a purple precipitate, which was then heated at 85° C. for 12 hrs (83.3% yield based on dpa). SIFSIX-3-Zn, {[Zn(pyr)$_2$ (SiF$_6$)]$_n$}, SIFSIX-3-Zn was synthesized using a previously known procedure at room temperature by diffusion of a methanol solution of pyrazine (2 mL, 1.3 mmol) into a methanol solution of ZnSiF$_6$ (2 mL, 0.6 mmol). Crystals were harvested after 3 days.

2—Low Pressure Gas Sorption Measurements:

Crystalline samples of SIFSIX-2-Cu-i and SIFSIX-3-Zn were activated for low pressure gas sorption analysis by washing the as-synthesized material with DMF followed by solvent exchange in methanol (MeOH) for 3 days. Each of the activated samples (80-160 mg) were transferred to a pre-weighed 6-mm large bulb glass sample cell and evacuated at room temperature for 92 hours (SIFSIX-2-Cu-i) and 25 hours (SIFSIX-3-Zn) on an Autosorb-1C (Quantachrome Instruments) low-pressure adsorption instrument, equipped with a turbo molecular vacuum pump. The low pressure gas sorption isotherms in FIG. 11 were collected on an ASAP 2020 Surface Area and Porosity Analyzer (Micromeritics) after activation of SIFSIX-2-Cu and SIFSIX-2-Cu-i as follows. As-synthesized SIFSIX-2-Cu was exchanged with 1:1 ethylene glycol/ethanol for 3 days and then ethanol for 5 days. The sample was degassed at room temperature under high vacuum (<5 μm Hg) for 16 hours prior to sorption analysis. During evacuation a color change from dark purple to aqua blue was observed. SIFSIX-2-Cu-i (synthesized by direct mixing) was activated by solvent exchange in MeOH for 3 days followed by evacuation at room temperature for 16 hours, during which time a color change from light purple to light blue occurred.

Figure 18:
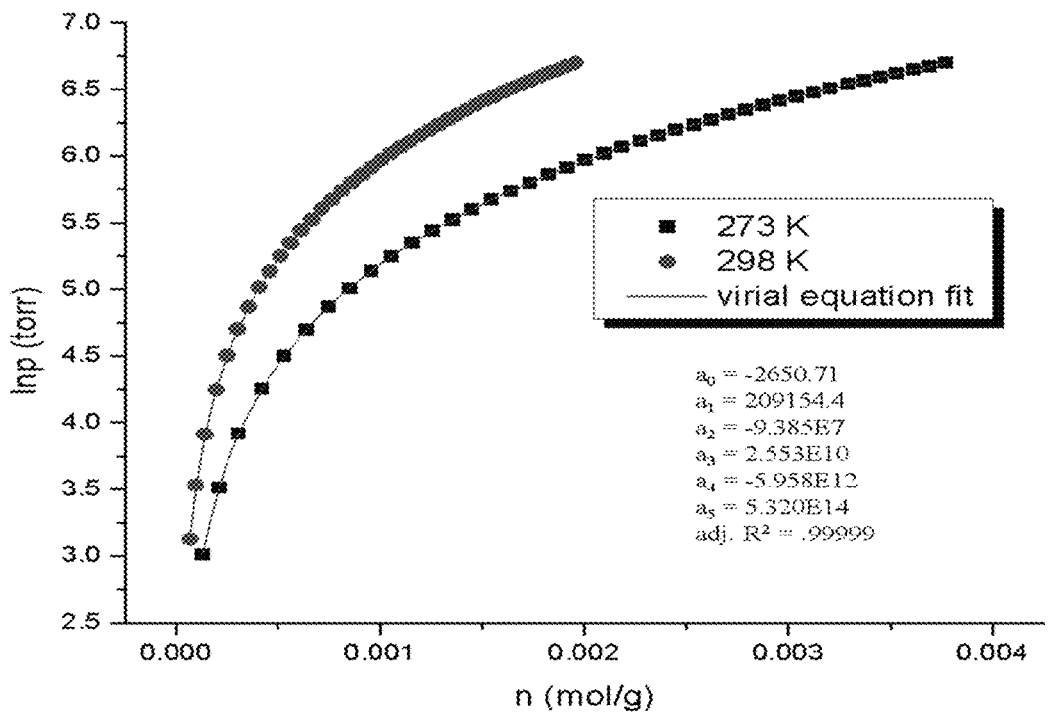
FIG. 18 illustrates a graph showing the virial fit of $CO_2$ isotherms of SIFSIX-2-Cu at 273 and 298 K (see FIGS. 11$a$ and 11$c$).
Figure 19:
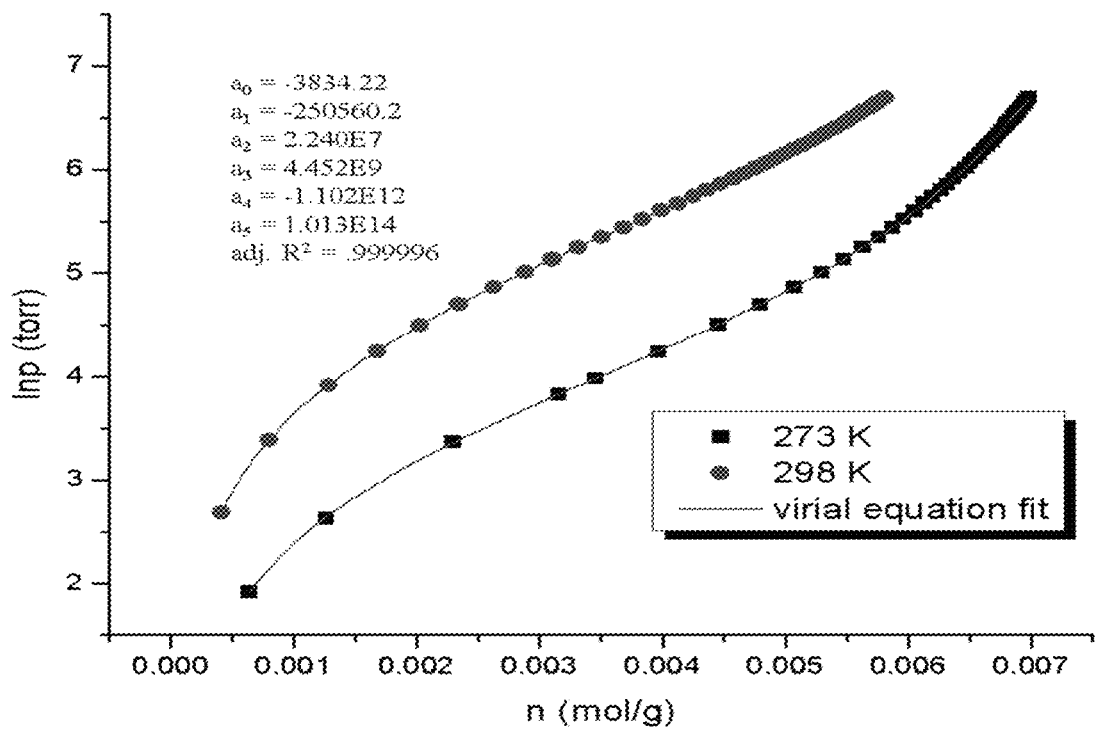
FIG. 19 illustrates a graph showing the virial fit of $CO_2$ isotherms of SIFSIX-2-Cu-i at 273 and 298 K (see FIGS. 11$a$ and 11$c$).

The apparent surface areas of SIFSIX-2-Cu-i and SIFSIX-3-Zn were determined from the nitrogen adsorption isotherm collected at 77 K and the $CO_2$ adsorption isotherm collected at 298 K, respectively by applying the Brunauer-Emmett-Teller (BET) and Langmuir models. The determination of the isosteric heat of adsorption ($Q_{st}$) for $CO_2$ in FIG. 2c was estimated by applying the Clausius-Clapeyron expression using the $CO_2$ sorption isotherms measured at 258, 273, 288 and 298 K for SIFSIX-2-Cu-i and 298, 308, 318, 328 and 338 K for SIFSIX-3-Zn. The bath temperature was precisely controlled using a Julabo recirculating control system containing a mixture of ethylene glycol and water. Data points below 0.76 Torr were not used for this calculation, in order to avoid possible artifacts at very low coverage. The Qst curves in FIG. 11c were estimated by applying the virial equation to the $CO_2$ isotherms at 273 and 298 K (FIGS. 18 and 19).

3—High Pressure Single Gas and Binary Gas Sorption Procedure and Measurements:

Single Gas Sorption (Gravimetric Technique)

Adsorption equilibrium measurements of pure gases were performed using a Rubotherm gravimetric-densimetric apparatus (Bochum, Germany) (Scheme S1), composed mainly of a magnetic suspension balance (MSB) and a network of valves, mass flowmeters and temperature and pressure sensors. The MSB overcomes the disadvantages of other commercially available gravimetric instruments by separating the sensitive microbalance from the sample and the measuring atmosphere and is able to perform adsorption measurements across a wide pressure range, i.e. from 0 to 20 MPa. The adsorption temperature may also be controlled within the range of 77 K to 423 K. In a typical adsorption experiment, the adsorbent is precisely weighed and placed in a basket suspended by a permanent magnet through an electromagnet. The cell in which the basket is housed is then closed and vacuum or high pressure is applied.

The evacuated adsorbent is then exposed to a continuous gas flow (typically 50 ml/min) or static mode at a constant temperature. The gravimetric method allows the direct measurement of the reduced gas adsorbed amount Ω. Correction for the buoyancy effect is required to determine the excess adsorbed amount using equation 1, where $V_{adsorbent}$ and $V_{ss}$ refer to the volume of the adsorbent and the volume of the suspension system, respectively. These volumes are determined using the helium isotherm method by assuming that helium penetrates in all open pores of the materials without being adsorbed. The density of the gas is determined experimentally using a volume-calibrated titanium cylinder. By weighing this calibrated volume in the gas atmosphere, the local density of the gas is also determined. Simultaneous measurement of adsorption capacity and gas phase density as a function of pressure and temperature is therefore possible. The excess uptake is the only experimentally accessible quantity and there is no reliable experimental method to determine the absolute uptake. For this reason, only the excess amounts are considered in this work.

$$\Omega = m_{excess} - \rho_{gas}(V_{adsorbent} + V_{ss}) \quad (1)$$

The pressure is measured using two Drucks high pressure transmitters ranging from 0.5 to 34 bar and 1 to 200 bar, respectively, and one low pressure transmitter ranging from 0 to 1 bar. Prior to each adsorption experiment, about 100 mg to 300 mg sample is outgassed at 433 K at a residual pressure $10^{-4}$ mbar. The temperature during adsorption measurements is held constant by using a thermostated circulating fluid.

Mixture Gas Adsorption (Gravimetric-Densimetric-Gas Analysis Technique)

Adsorption measurements of binary gas mixtures were carried out using a Rubotherm gravimetric-densimetric technique coupled to a gas analyzer (gas chromatography (GC) or mass spectrometery (MS)) (Scheme S2) enabling accurate measurements of mixture gas adsorption in the pressure range of 0-10 bar. The gas dosing system comprise there mass flow controllers (MFC) for gas premixing. Premixed gases can be also supplied. The adsorbent sample (up to 2 g) is placed in a sample a closed holder to prevent blowing the fine powder samples during gas expansion from the dosing cell to adsorption cell, and out gassed at a maximum temperature of 298 K before the actual adsorbent mass is measured.

At the beginning of an experiment, the whole installation is under vacuum, and then the premixed gas is supplied to the first dosing volume (V1) while the adsorption cell kept isolated ($V_4$ and $V_6$ closed). Knowing the dosing volume, the pressure and the temperature and using an appropriate (p-v-T) equation of state (EOS) the amount of gas introduced can be determined and controlled to match the amount of adsorbent available for analysis which is a critical factor influencing the accuracy of the set-up. The circulation pump is switched on to homogenize the gas mixture. The system allows checking the initial gas composition by sampling the premixed gas to the gas analysers. Once the mixture is completely homogeneous it is directed in the adsorption cell by opening valves $V_4$ and $V_6$ then the circulation pump is switched on. Once the adsorption equilibrium is reached, the circulation pump is switched off and the mass is monitored with the magnetic balance, the mass being recorded every 10 min. If the standard deviation is under 50 μg, the value is recorded; otherwise, the circulation pump is switched on for additional time and the control of equilibrium state is repeated. When the mass is stable, the mass, temperature and pressure are then recorded. Valve $V_{11}$ is then opened and the gas phase after adsorption analyzed by GC or MS. Using an appropriate (p-v-T) EOS for the studied mixture, in addition to the pressure, temperature and gas mixture composition after adsorption, the number of mole adsorbed of compound 1 can be calculated using equation (2):

$$n_{1ads} = \frac{\frac{P \cdot V_1 \cdot y'_1}{R \cdot T} + y_1 \cdot \left(\frac{m_{ads}}{M_2} - \frac{P \cdot V_1 \cdot y'_1}{R \cdot T} - \frac{P \cdot V_1 \cdot y'_2}{R \cdot T}\right)}{1 + y_1 \cdot \left(\frac{M_1}{M_2} - 1\right)} \cdot \frac{1}{m_{sample}} \quad (2)$$

(2)
Where:
$n_{1ads}$ adsorbed amount of compound 1,
P: pressure in the dosing cell
$V_1$: volume of the dosing cell
$y'_1$: gas phase composition before adsorption
$y_1$: gas phase composition after adsorption of compound 1
T: temperature
R: ideal gas constant
$m_{ads}$: total adsorbed amount in mg
$M_1$: Molecular weight of compound 1
$M_2$: Molecular weight of compound 2
$m_{sample}$: mass the evacuated sample The number of mole adsorbed of compound 2 $n_{2ads}$ is calculated using equation 3:

$$n_{2ads} = \frac{m_{adstotal}}{M_1 \cdot y_1 + M_2 \cdot y_2} - n_{ads1} \quad (3)$$

The adsorbed phase composition of compound 1 and 2 is then calculated using equations 4 and 5:

$$x_1 = \frac{n_{1ads}}{n_{adstot}}; \quad (4)$$

$$x_2 = \frac{n_{2ads}}{n_{adstot}} \quad (5)$$

The selectivity of compound 2 over 1 is then calculated using equation 6:

$$S_{2/1} = \frac{x_2/x_1}{y_2'/y_1'} \quad (6)$$

4—Column Breakthrough Test Set-Up, Procedure and Measurements:

The experimental set-up used for dynamic breakthrough measurements is shown in Scheme S3. The gas manifold consisted of three lines fitted with mass flow controllers Line "A" is used to feed an inert gas, most commonly helium, to activate the sample before each experiment. The other two lines, "B" and "C" feed a mixture of $CO_2$ and other gases like $N_2$, $CH_4$, $H_2$. Hence, gas mixtures with concentrations representative of different industrial gases may be prepared. Whenever required, gases flowing through lines "B" and "C" may be mixed before entering a column packed with SIFSIX-2-Cu-i and SIFSIX-3-Zn using a four-way valve. The stainless steel column was 27 mm in length with 4 mm of inner (6.4 mm outer) diameter. The column downstream was monitored using a Hideen mass spectrometer. In a typical experiment, 0.1-0.4 g of adsorbent was treated at 298 K overnight under helium flow of 5 mL/min, then the gas flow was switched to the desired gas mixture at the same flow rate. The complete breakthrough of $CO_2$ and other species was indicated by the downstream gas composition reaching that of the feed gas. Experiments in the presence of 74% relative humidity were performed by passing the gas mixture through water vapor saturator at 20° C.

The adsorption capacity for each compound was estimated from the breakthrough curves using the following equation:

$$n_{adsi} = FC_i t_i \quad (7)$$

where $n_{adsi}$ is the adsorption capacity of the compound i, F is the total molar flow, $C_i$ is the concentration of compound i entering the column and $t_i$ is the time corresponding to compound i, which is estimated from the breakthrough profile.

The selectivity of $CO_2$ over species i in the binary mixture of $CO_2$ and species i is determined using the following equation:

$$S_{CO_2/i} = \frac{x_{CO_2}/x_i}{y_{CO_2}/y_i} \quad (8)$$

(8)

where x and y refer to the molar composition of the adsorbed phase and the gas phase, respectively.

5—Kinetics of Gas Adsorption:

Kinetic studies of $CO_2$, $N_2$, $O_2$, $H_2$ and $CH_4$ adsorption on SIFSIX-3-Zn were carried out using the Rubotherm gravimetric apparatus operating in dynamic regime (Scheme S1). Initially, SIFSIX-3-Zn was properly evacuated at 298 K. In order to achieve an immediate constancy of pressure (0.5 bar) during kinetics tests and avoid the often noisy uptake during the rapid introduction of the studied gas, an initial baseline was set-up using helium gas at 0.5 bar for single gases and 1 bar for mixture, then the studied single gas or mixture is flushed with a flow of 300 ml/min to avoid any dependence of the kinetics on the mass flow controller. The fractional uptake was calculated by dividing the non-equilibrium uptake at time $t_i$ by the equilibrium uptake at equilibrium. Adsorption kinetics analysis involving $CO_2/N_2$:10/90 was carried out at 5 bar to compensate for the combination of the low $CO_2$ partial pressure and the large amount of material studied (1g).

6—X-Ray Diffraction Studies:

Powder X-Ray Diffraction (PXRD):

PXRD patterns were recorded at room temperature on a Bruker D8 ADVANCE diffractometer at 20 kV, 5 mA for Cu—Kα (λ=1.54056 Å), with a scan speed of 1 s/step and a step size of 0.02° in 2θ (total scan duration=30 min.).

Single-Crystal X-Ray Diffraction:

Single crystal x-ray diffraction data for SIFSIX-2-Cu were collected using a Bruker-AXS SMART-APEXII CCD diffractometer equipped with CuKα radiation (λ=1.54178 Å). Diffraction data for SIFSIX-2-Cu-i were collected using synchrotron radiation (λ=0.49594 Å) at the Advanced Photon Source, Chicago, Ill.

Indexing was performed using APEX2[2] (difference vectors method). Data integration and reduction were performed using SaintPlus 6.01[3]. Absorption correction was performed by the multi-scan method implemented in SADABS[4]. Space groups were determined using XPREP implemented in APEX2. The structure was solved using SHELXS-97 (direct methods) and refined using SHELXL-97 (full-matrix least-squares on F2) contained in APEX2 and WinGX v1.70.01[5-8] programs packages. Hydrogen atoms were placed in geometrically calculated positions and included in the refinement process using a riding model with isotropic thermal parameters: $U_{iso(H)} = 1.2\, U_{eq(-CH)}$. For SIFSIX-2-Cu the contribution of heavily disordered solvent molecules was treated as diffuse using the Squeeze procedure implemented in Platon[9,10]. In the structure of SIFSIX-2-Cu-i a methanol molecule is disordered over two positions. The amount of methanol in the crystal was established through occupancy refinement of the oxygen atom. The hydrogen atom of the hydroxyl group was placed in a geometrically calculated position and refined using an H . . . F distance restraint. This distance was chosen based on a search of the Cambridge Structural Database. For both structures the disordered $SiF_6$ was refined using the SADI geometry restraint. Crystal data and refinement conditions are shown in Tables 1 and 2 for the Supplemental section.

7—Effect of Moisture Upon Gas Adsorption:

The impact of water vapor on $CO_2$ capacity and selectivity was evaluated in both SIFSIX-2-Cu-i and SIFSIX-3-Zn. $CO_2$ cyclic adsorption studies were performed at humidity levels similar to those in real applications, i.e. 74% RH. Results are summarized below:

- Water vapor adsorption isotherms for SIFSIX-2-Cu-i and SIFSIX-3-Zn collected under pure $N_2$ atmosphere reveal type I behavior with water uptakes of 20 wt % and 11 wt %, respectively at 74% RH.
- Water sorption affinity/capacity was reduced in the presence of $CO_2$ gas mixtures as revealed by breakthrough experiments at 74% RH for both CO2/H2:30/70 and $CO_2/N_2$:10/90 mixtures (1.2-1.5 wt % for SIFSIX-2-Cu-i and SIFSIX-3-Zn). Each material, particularly SIFSIX-3-Zn, exhibits remarkably selective $CO_2$ adsorption in the presence of water. (FIGS. 21a, 21b, 22a and 22b).

Interestingly, the presence of water in the mixture (e.g. CO$_2$/H$_2$:30/70) has a negligible effect at elevated CO$_2$ concentrations. Breakthrough time for CO$_2$ in the presence of 74% RH is only marginally shorter than under dry conditions, thus CO$_2$ uptake and selectivity in the humid mixture are only slightly reduced (1.61 mmol/g and 191 at 74% RH vs. 1.99 mmol/g and 237 at 0% RH for SIFSIX-2-Cu-i; FIG. 21b).

Analysis of the effect of adsorption/breakthrough cycling on SIFSIX-3-Zn shows very little alteration of CO$_2$ uptake and selectivity in CO$_2$/H$_2$:30/70 and CO$_2$/N$_2$:10/90 mixtures after multiple adsorption cycles. Additionally, the CO$_2$ breakthrough time was not reduced at 74% RH as compared to the breakthrough time at 0% RH (FIGS. 22(a) and 22(b)). This finding is extremely significant; H$_2$O vapor has a negligible effect on the CO$_2$ capture properties, in contrast to the benchmark zeolite 13X, where extensive drying of the gas stream is required to achieve optimal separations[12-14].

Figure 23:
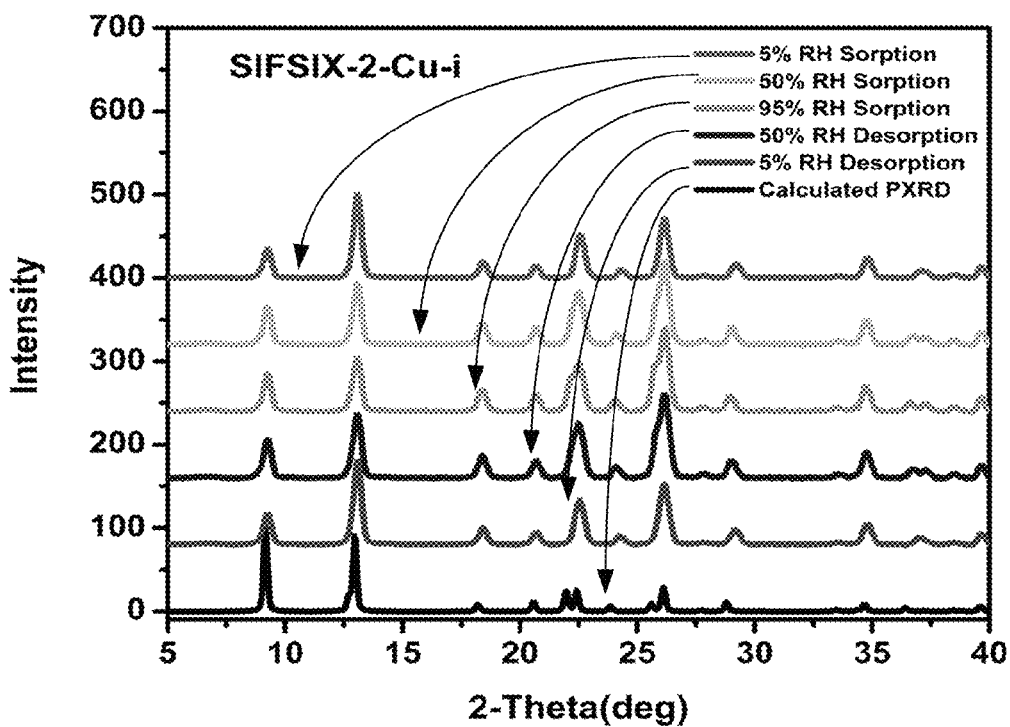
FIG. 23 illustrates a graph showing PXRD patterns of SIFSIX-2-Cu-i when exposed to varying relative humidity in a nitrogen atmosphere.
Figure 24:
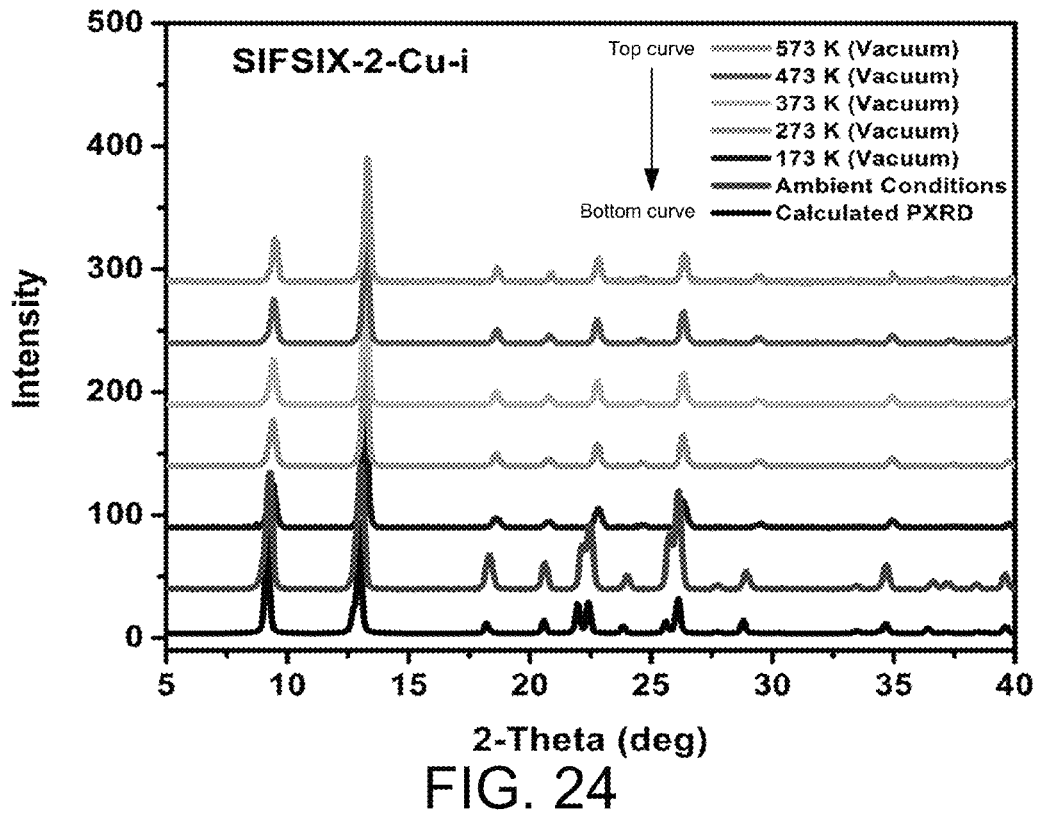
FIG. 24 illustrates a graph showing VT-PXRD patterns of SIFSIX-2-Cu-i under vacuum at non-ambient temperatures (173 K-573 K).

In addition, the PXRD pattern of SIFSIX-2-Cu-i at variable degrees of relative humidity (5-95%; FIG. 23) showed that crystallinity was retained when the compound was in contact with H$_2$O in the presence of relevant gas mixtures. Variable temperature powder x-ray diffraction (VT-PXRD) experiments reveal thermal stability up to at least 573 K (FIG. 24).

Figure 25:
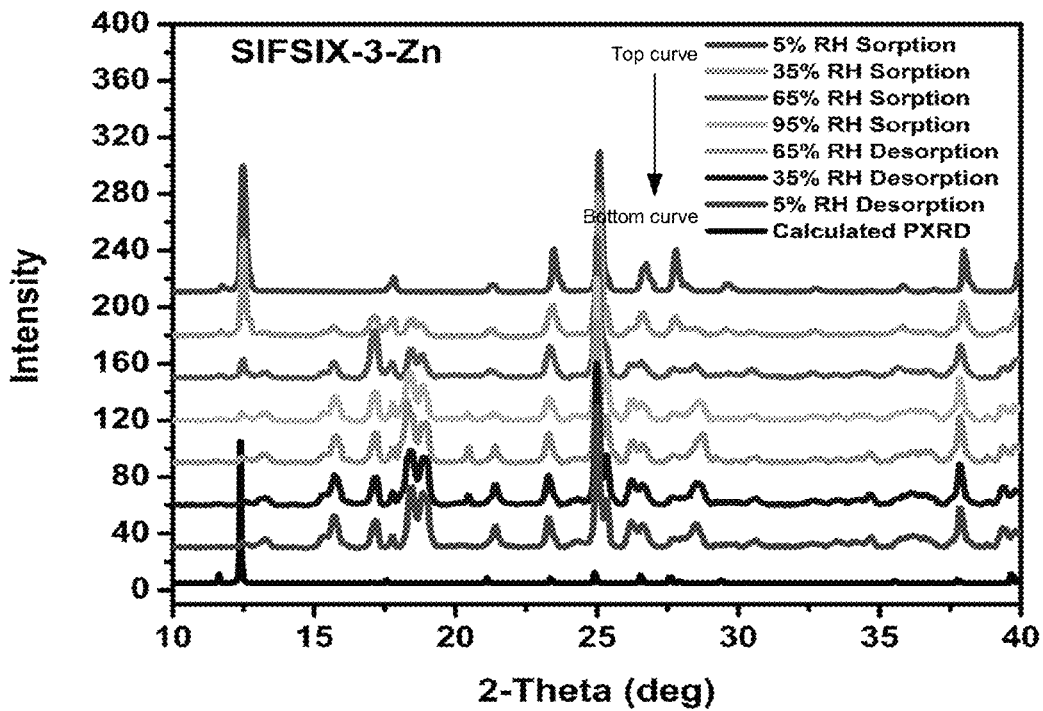
FIG. 25 illustrates a graph showing PXRD patterns of SIFSIX-3-Zn when exposed to varying relative humidity in a nitrogen atmosphere.
Figure 26:
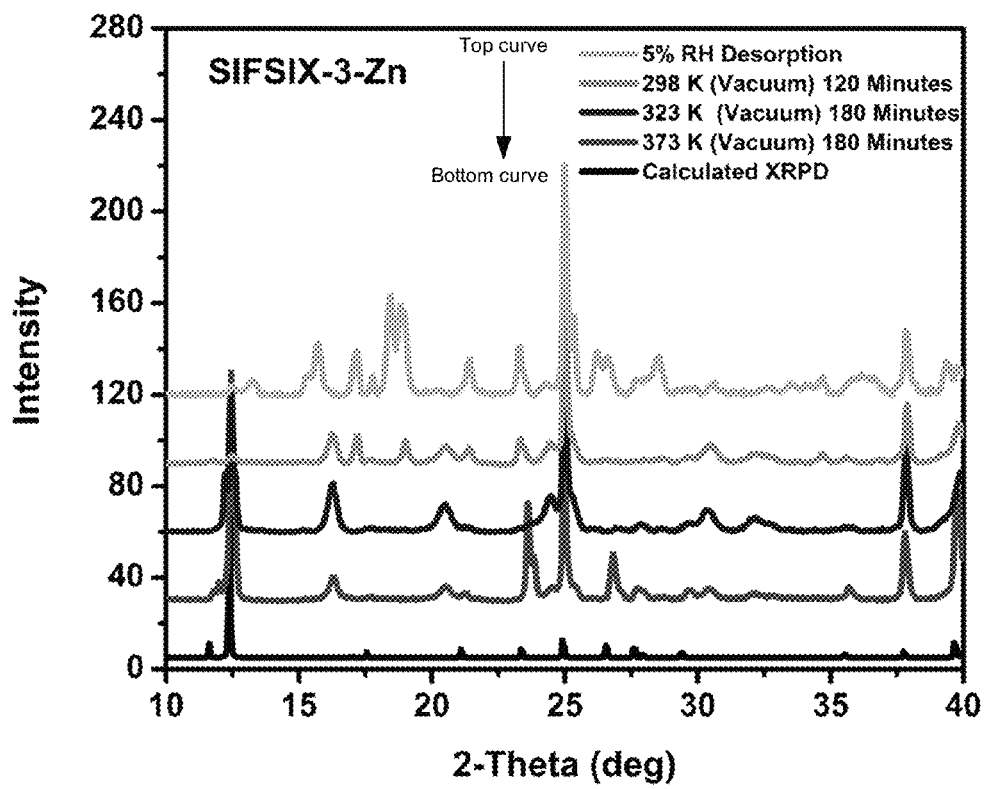
FIG. 26 illustrates a graph showing the PXRD of SIFSIX-3-Zn after humidity PXRD experiment and regeneration by heating under vacuum.
Figure 27:
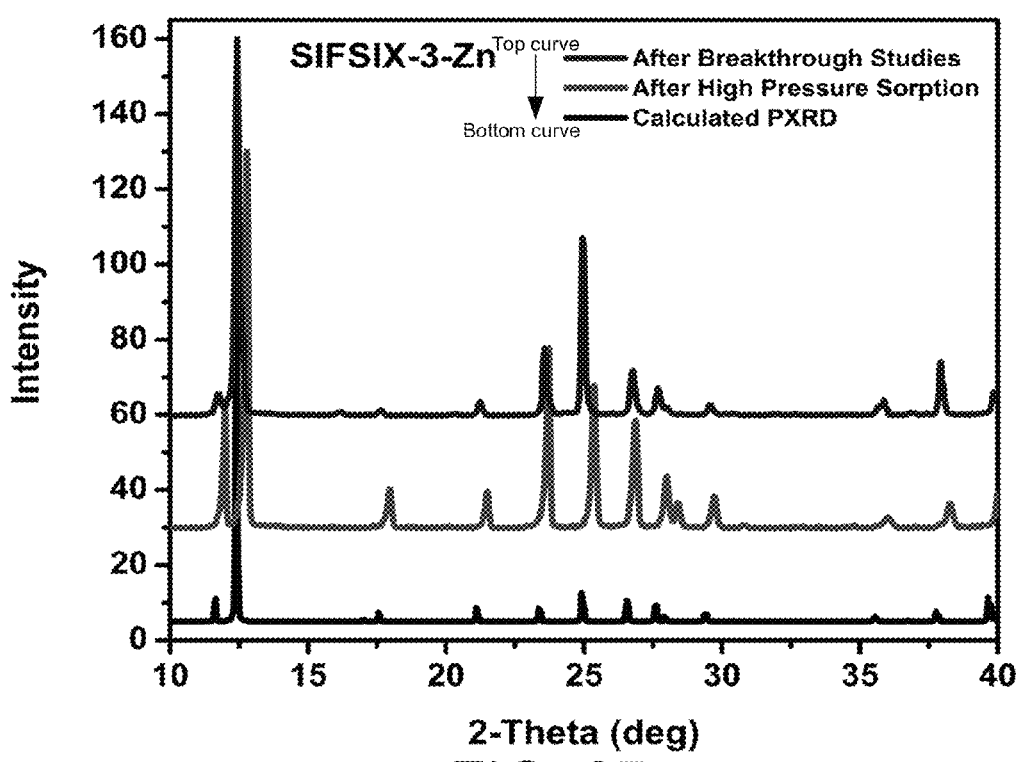
FIG. 27 illustrates a graph showing the PXRD of SIFSIX-3-Zn after multiple cycles of humid breakthrough experiments and high pressure sorption experiments compared to the calculated powder pattern.
Figure 28:
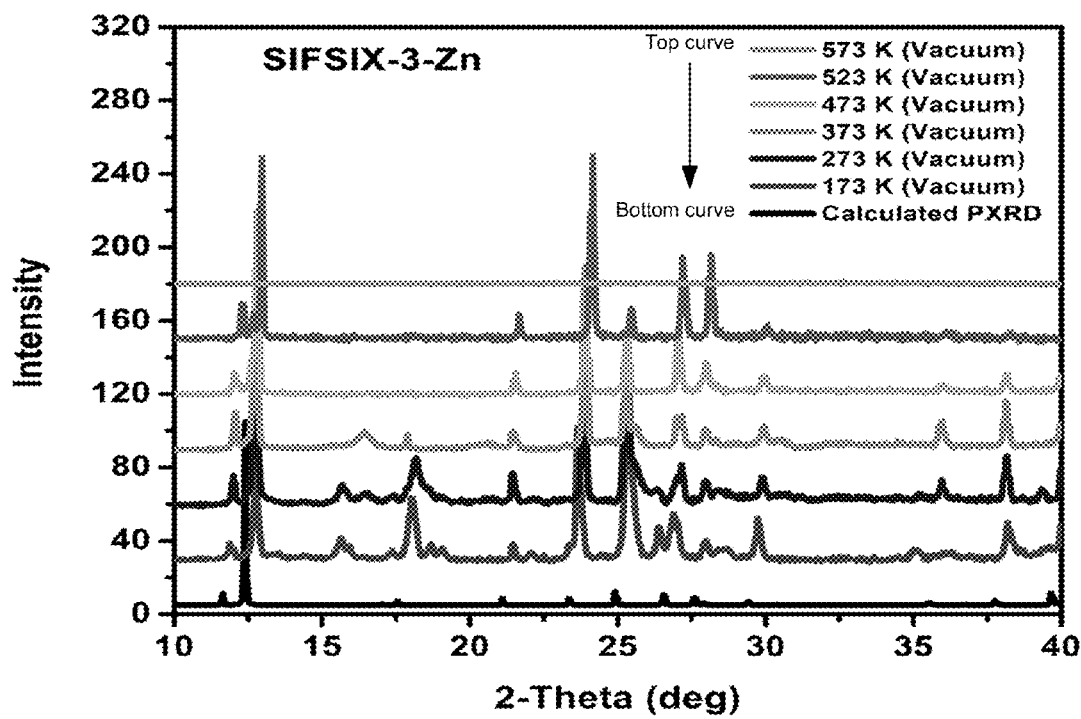
FIG. 28 illustrates a graph showing VT-PXRD patterns of SIFSIX-3-Zn under vacuum and at non-ambient temperatures (173 K-573 K).

Notably, SIFSIX-3-Zn exhibits a phase change when exposed to relative humidity higher than 35%, as indicated by PXRD peak shifts and the appearance of additional peaks (FIG. 25). Regeneration of the original material, as verified by the reappearance of the major diffraction peaks, is accomplished by heating SIFSIX-3-Zn under vacuum for several hours at 323-373 K. Reducing the % RH alone did not reverse the phase change (FIG. 26). PXRD analyses of regenerated SIFSIX-3-Zn after cyclic breakthrough tests at 74% RH as well as after high pressure sorption experiments confirm the presence of the original material (FIG. 27). VT-PXRD experiments demonstrate that SIFSIX-3-Zn maintains crystallinity up to 523 K (FIG. 28).

8—SIFSIX-3-Zn Modeling Details:

Force field parameters required for modeling sorbate-MOF interactions were established, including repulsion and dispersion parameters, atomic partial point charges, and interacting atomic point polarizabilities according to considerations presented previously[15-17]. Grand Canonical Monte Carlo (GCMC) simulations were performed to model CO$_2$ sorption in SIFSIX-3-Zn at experimentally-considered state points.

Figure 32:
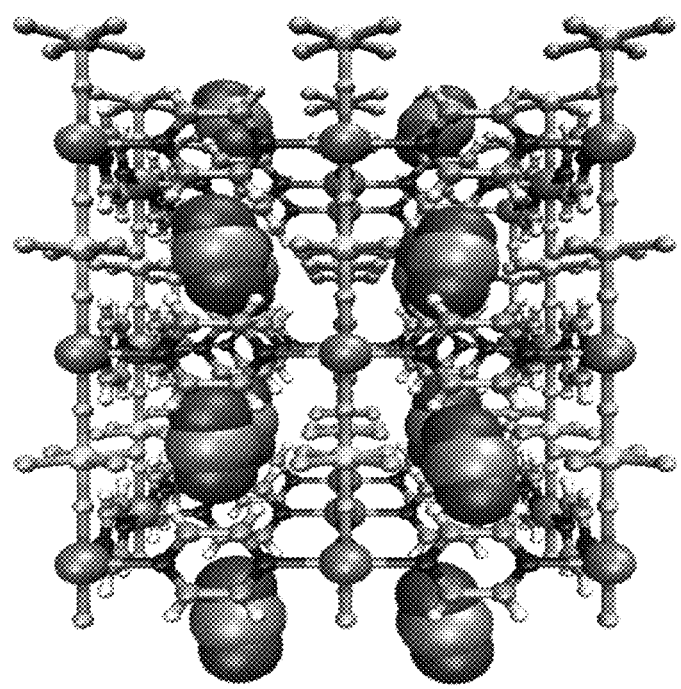
FIG. 32 illustrates a graph showing the calculations show $CO_2$ molecules adsorbed in the pores of SIFSIX-3-Zn with the electropositive carbon atoms attracted to the SiF62-pillaring anions.

GCMC-generated CO$_2$ adsorption isotherms for SIFSIX-3-Zn (FIG. 31) are in good agreement with experimental data. The associated molecular configurations reveal that maximum loading at the temperatures considered occurs at one CO$_2$ molecule per unit cell. FIG. 32 shows the electropositive carbon atoms of CO$_2$ interacting strongly with four negatively charged framework fluorine atoms, directing the carbon atoms along the channels parallel to the SIFSIX-3-Zn pillars, consistent with steric constraints.

Figure 33:
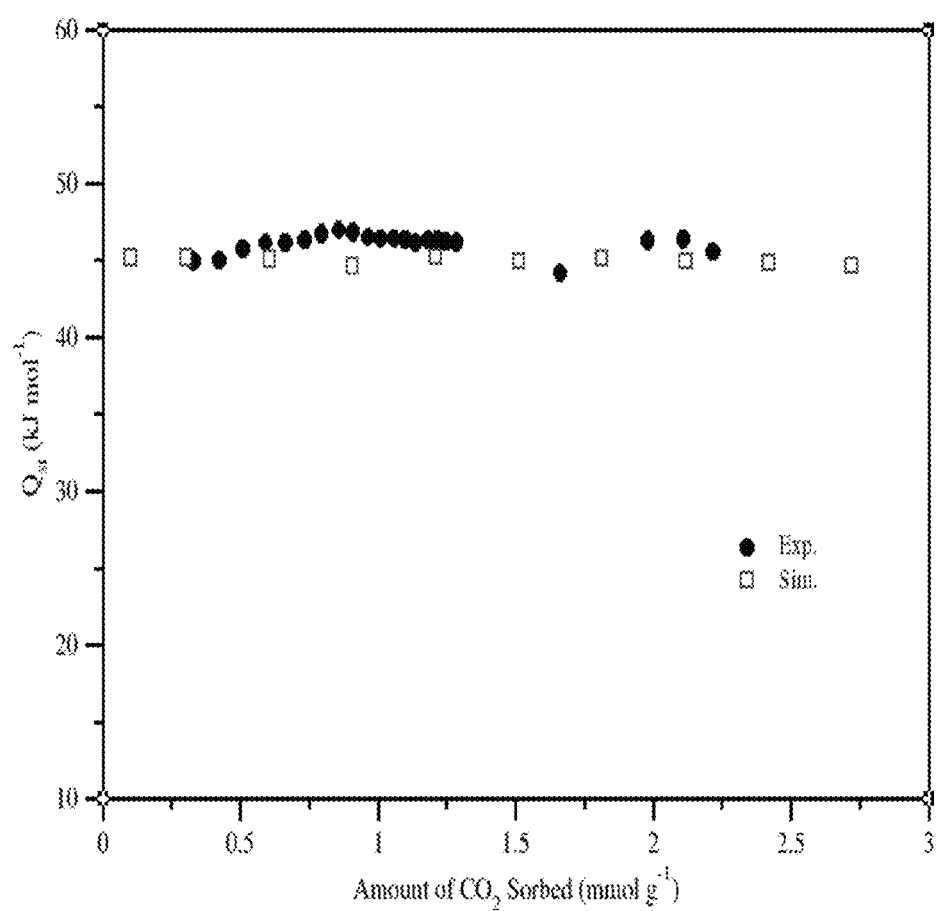
FIG. 33 illustrates a graph showing the simulated and experimental Qst plots for SIFSIX-3-Zn.
Figure 34:
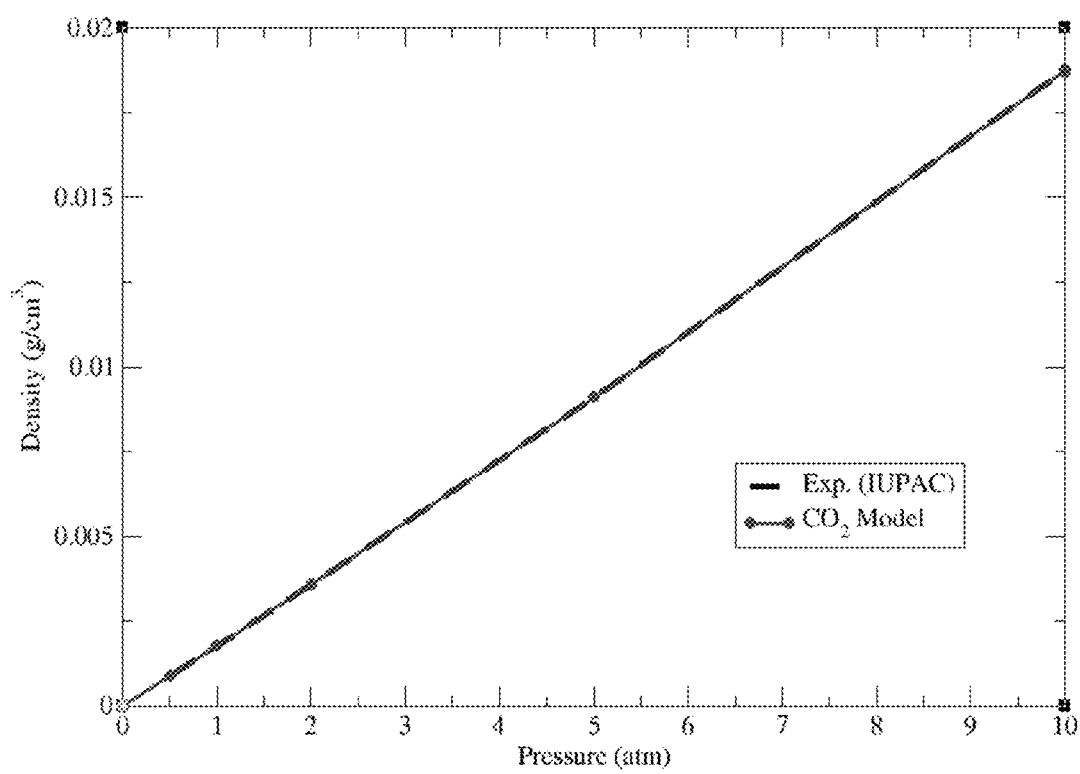
FIG. 34 illustrates a graph showing a pressure-density isotherm for $CO_2$ at 298.15 K for the $CO_2$ model used in this work (red) compared to experimental data (black).

The simulated $Q_{st}$ values are in excellent agreement with experiment, showing a relatively constant $Q_{st}$ of ca. 45 kJ/mol for loadings of up to one CO$_2$ molecule per unit cell (FIG. 33). This is consistent with saturation of the favored sorption sites. The polarizable CO$_2$ model used in this work was developed using a previously described procedure[18,19]. To verify the accuracy of the model in the bulk environment, an isothermal pressure-density plot was produced at 298.15 K using Grand canonical Monte Carlo (GCMC) methods and the results were compared to the corresponding experimental data[20]. The isotherm for the model was found to be in excellent agreement with experimental data for the considered pressure range to within joint uncertainties (FIG. 34).

Tables for the Supplemental Section

TABLE 1

Crystal data and structure refinement for SIFSIX-2-Cu

| | |
|---|---|
| Identification code | SIFSIX-2-Cu, [Cu(dpa)$_2$(SiF$_6$)]$_n$ |
| Empirical formula | C$_{24}$H$_{16}$CuF$_6$N$_4$Si |
| Formula weight | 566.04 |
| Temperature | 100(2) K |
| Wavelength | 1.54178 Å |
| Crystal system, space group | Tetragonal, P4/mmm |
| Unit cell dimensions | a = 13.6316(14) Å α = 90° |
| | b = 13.6316(14) Å β = 90° |
| | c = 7.9680(10) Å γ = 90° |
| Volume | 1480.6(3) Å$^3$ |
| Z, Calculated density | 1, 0.635 g/cm$^3$ |
| Absorption coefficient | 0.965 mm$^{-1}$ |
| F$_{(000)}$ | 285 |
| Crystal size | 0.10 × 0.05 × 0.05 mm |
| Theta range for data collection | 3.24 to 65.87° |
| Limiting indices (h, k, l) | (−11/15, −12/15, −9/9) |
| Reflections collected/unique | 6428/803 (R$_{int}$ = 0.1021) |
| Completeness to theta = 65.87° | 99.10% |
| Absorption correction | Semi-empirical from equivalents |
| Max. and min. transmission | 0.9533 and 0.9097 |
| Refinement method | Full-matrix least-squares on F$^2$ |
| Data/restraints/parameters | 803/1/50 |
| Goodness-of-fit on F$^2$ | 1.054 |
| Final R indices [I > 2σ(I)] | R$_1$ = 0.0444, wR$_2$ = 0.1013 |
| R indices (all data) | R$_1$ = 0.0515, wR$_2$ = 0.1046 |
| Largest diff. peak and hole | 0.654 and −0.366 e/Å$^{-3}$ |

TABLE 2

Crystal data and structure refinement for SIFSIX-2-Cu-i

| | |
|---|---|
| Identification code | SIFSIX-2-Cu-i, {[Cu(dpa)$_2$(SiF$_6$)]n · 2.5CH$_3$OH} |
| Empirical formula | C$_{26.50}$H$_{26}$CuF$_6$N$_4$O$_{2.50}$Si |
| Formula weight | 646.14 |
| Temperature | 100(2) K |
| Wavelength | 0.49594 Å |
| Crystal system, space group | Tetragonal, I4/mmm |
| Unit cell dimensions | a = 13.6490(11) Å α = 90° |
| | b = 13.6490(11) Å β = 90° |
| | c = 8.0920(6) Å γ = 90° |
| Volume | 1507.5(2) Å$^3$ |
| Z, Calculated density | 2, 1.423 g/cm$^3$ |
| Absorption coefficient | 0.282 mm$^{-1}$ |
| F$_{(000)}$ | 660 |
| Crystal size | 0.02 × 0.01 × 0.01 mm |
| Theta range for data collection | 2.04 to 19.68° |
| Limiting indices (h, k, l) | (−18/18, −16/18, −8/9) |
| Reflections collected/unique | 11521/535 (R$_{int}$ = 0.0444) |
| Completeness to theta = 17.39° | 98.40% |
| Absorption correction | Semi-empirical from equivalents |
| Max. and min. transmission | 0.9972 and 0.9944 |
| Refinement method | Full-matrix least-squares on F$^2$ |
| Data/restraints/parameters | 535/2/58 |
| Goodness-of-fit on F$^2$ | 1.012 |
| Final R indices [I > 2σ(I)] | R$_1$ = 0.0455, wR$_2$ = 0.1432 |
| R indices (all data) | R$_1$ = 0.0488, wR$_2$ = 0.1456 |
| Largest diff. peak and hole | 0.379 and −0.517 e/Å$^{-3}$ |

TABLE 3

Comparison of experimental and theoretical micropore volumes (cm³/g) of SIFSIX-2-Cu and SIFSIX-2-Cu-i.

| MOM | $V_{calc}^a$ | $V_{exp}^b$ |
|---|---|---|
| SIFSIX-2-Cu | 1.10 | 1.15 |
| SIFSIX-2-Cu-i | 0.25 | 0.26 |

[a] calculated by Platon[9,10]
[b] experimental value determined by t-plot method

TABLE 4

Force field parameters for the polarizable $CO_2$ model used in the molecular simulations in this work.

| Atomic Site | Distance (Å)[a] | σ (Å) | ε (K) | q (e⁻) | α° (Å³) |
|---|---|---|---|---|---|
| C | 0.000 | 3.30366 | 19.61757 | 0.77134 | 1.2281 |
| O | 1.162 | 0.00000 | 0.00000 | −0.38567 | 0.7395 |
| OA[b] | 1.208 | 2.99429 | 46.47457 | 0.00000 | 0.0000 |

[a] refers to the distance from the molecular centre-of-mass.
[b] refers to the off-atom positions.

References, each of which is incorporated herein by reference

1. Coe, B. J. et al. Syntheses, spectroscopic and molecular quadratic nonlinear optical properties of dipolar ruthenium (II) complexes of the ligand 1,2-phenylenebis(dimethylarsine). *Dalton Trans.*, 2935-2942 (2004).
2. Bruker. APEX2. Bruker AXS Inc., Madison, Wis., USA (2010).
3. Bruker. SAINT. Data reduction software. Bruker AXS Inc., Madison, Wis., USA (2009).
4. Sheldrick, G. M. SADABS. Program for empirical absorption correction. University of Gottingen, Germany (2008).
5. Farrugia L. *J. Appl. Cryst.*, 32, 837-838 (1999).
6. Sheldrick, G. M. SHELXL-97. Program for the refinement of crystal structure (1997).
7. Sheldrick, G. M. *ActaCryst.*, A46, 467-473 (1990).
8. Sheldrick, G. M. *ActaCryst.*, A64, 112-122 (2008).
9. Spek, T. L. *Acta Cryst.*, A46, 194-201 (1990).
10. Spek, T. L. *Acta Cryst.*, A46, c34 (1990).
11. F. H. Allen. *ActaCryst.*, B58, 380-388 (2002).
12. F. Brandani, D. Ruthven. The effect of water on the adsorption of $CO_2$ and $C_3H_8$ on Type X zeolites. *Ind. Eng. Chem. Res.*, 43, 8339-834 (2004).
13. D. Bonenfant, M. Kharoune, P. Niquette, M. Mimeault, R. Hausler, R. Advances in principal factors influencing carbon dioxide adsorption on zeolites. *Sci. Technol. Adv. Mater.* 9, 013001-013007 (2008).
14. R. Serna-Guerrero, Y. Belmabkhout, A. Sayari, Further investigations of $CO_2$ capture using triamine-grafted pore-expanded mesoporous silica. *Chem. Eng. J.* 158, 513-519 (2010).
15. Belof, J. L., Stern, A. C., Eddaoudi, M. & Space, B. On the mechanism of hydrogen storage in a metal-organic framework material. *J. Am. Chem. Soc.* 129, 15202-15210 (2007).
16. Stern, A. C.; Belof, J. L.; Eddaoudi, M.; Space, B. Understanding hydrogen sorption in a polar metal-organic framework with constricted channels. *J. Chem. Phys.* 136, 034705 (2012).
17. Forrest, K. A.; Pham, T.; McLaughlin, K.; Belof, J. L.; Stern, A. C.; Zaworotko, M. J.; Space, B. Simulation of the mechanism of gas sorption in a metal-organic framework with open metal sites: Molecular hydrogen in PCN-61. *J. Phys. Chem. C.* 116 (29), 15538-15549 (2012).
18. Belof, J. L., Stern, A. C. & Space, B. An accurate and transferable intermolecular diatomic hydrogen potential for condensed phase simulation. *J. Chem Theory Comput.* 4, 1332-1337 (2008).
19. McLaughlin, K., Cioce, C. R., Belof, J. L. & Space, B. A molecular $H_2$ potential for heterogeneous simulations including polarization and many-body van der Waals interactions. *J. Chem. Phys.* 136, 194302 (2012).
20. Angus, S., Armstrong, B. & de Reuck, K. M. International Thermodynamic Tables of the Fluid State: Carbon Dioxide. Vol. 3 68-76 (Pergamon Press, 1976).
21. Merel, J., Clausse, M. &Meunier, F. Experimental investigation on $CO_2$ post-combustion capture by indirect thermal swing adsorption using 13X and 5A zeolites. *Ind. Eng. Chem. Res.* 47, 209-215 (2008).

In regard to the discussion herein including the Examples above and the claims, it should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to measurement techniques and the units of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A method of capturing $CO_2$ in a gas, comprising:
   exposing the gas to a hydrophobic multicomponent metal-organic material (MOM), wherein the gas includes $CO_2$ and water vapor, wherein the MOM has a greater relative affinity for $CO_2$ over the water vapor, wherein the MOM is selected from the group consisting of: [Cu(4,4'-dipyridylacetylene)$_2$(SiF$_6$)]$_n$, where n is 1 to 100,000,000; a pair of interpenetrated nets of [Cu(4,4'-dipyridylacetylene)$_2$(SiF$_6$)]$_n$; and [Zn(pyr)$_2$(SiF$_6$)]$_n$, wherein n is 1 to 100,000,000; and
   capturing the $CO_2$ in the MOM.

2. The method of claim 1, wherein the gas includes at least one of the following gases: $N_2$, $H_2$, and $CH_4$, wherein the MOM has a greater relative affinity for $CO_2$ over each one of $N_2$, $H_2$, and $CH_4$.

3. The method of claim 1, wherein the MOM has a primitive cubic topology.

4. A method of separating components in a gas, comprising:
   exposing a gas including a first component and a second component to a hydrophobic multidimensional metal-organic material (MOM), wherein the MOM has a greater relative affinity for the first component over a second component, wherein the MOM is selected from the group consisting of: [Cu(4,4'-dipyridylacetylene)$_2$ (SiF$_6$)]$_n$, where n is 1 to 100,000,000; a pair of interpenetrated nets of [Cu(4,4'-dipyridylacetylene)$_2$(SiF$_6$)]$_n$; and [Zn(pyr)$_2$(SiF$_6$)]$_n$, wherein n is 1 to 100,000,000, wherein the first component is CO$_2$ and the second component is selected from the group consisting of N$_2$, H$_2$, or CH$_4$; and capturing the first component in the MOM.

5. The method of claim 4, wherein the MOM has a greater relative affinity for the first component over water vapor present in the gas.

6. The method of claim 5, wherein the first component is CO$_2$ and the second component is N$_2$.

7. The method of claim 5, wherein the first component is CO$_2$ and the second component is H$_2$.

8. The method of claim 5, wherein the first component is CO$_2$ and the second component is CH$_4$.

\* \* \* \* \*

UNITED STATES PATENT AND TRADEMARK OFFICE
CERTIFICATE OF CORRECTION

PATENT NO. : 9,138,719 B1  Page 1 of 1
APPLICATION NO. : 13/800690
DATED : September 22, 2015
INVENTOR(S) : Eddaoudi et al.

It is certified that error appears in the above-identified patent and that said Letters Patent is hereby corrected as shown below:

Title Page, item (73), change "University of South Florida, Tampa, FL (US)" to

-- "University of South Florida, Tampa, FL (US), and King Abdullah University of Science and Technology, Thuwal, Saudi Arabia" --

Signed and Sealed this
Fifth Day of April, 2016

Michelle K. Lee
*Director of the United States Patent and Trademark Office*